(12) United States Patent
Segal

(10) Patent No.: US 10,186,167 B2
(45) Date of Patent: Jan. 22, 2019

(54) SYSTEMS AND METHODS FOR MOBILE COMPUTER GUIDED COACHING

(71) Applicant: ActiFi, Inc., Plymouth, MN (US)

(72) Inventor: Spenser Segal, Plymouth, MN (US)

(73) Assignee: ActiFi, Inc., Plymouth, MN (US)

( * ) Notice: Subject to any disclaimer, the term of this patent is extended or adjusted under 35 U.S.C. 154(b) by 207 days.

(21) Appl. No.: 15/140,096

(22) Filed: Apr. 27, 2016

(65) Prior Publication Data

US 2016/0314705 A1    Oct. 27, 2016

Related U.S. Application Data

(60) Provisional application No. 62/153,275, filed on Apr. 27, 2015.

(51) Int. Cl.

| G09B 19/00 | (2006.01) |
|---|---|
| G06F 3/0484 | (2013.01) |
| G06F 3/0482 | (2013.01) |
| G06Q 10/06 | (2012.01) |
| G06Q 10/10 | (2012.01) |
| G09B 7/00 | (2006.01) |

(52) U.S. Cl.
CPC .......... *G09B 19/00* (2013.01); *G06F 3/0482* (2013.01); *G06F 3/04842* (2013.01); *G06Q 10/0639* (2013.01); *G06Q 10/06393* (2013.01); *G06Q 10/10* (2013.01); *G09B 7/00* (2013.01)

(58) Field of Classification Search
CPC .............................. G09B 19/00; G09B 19/003
See application file for complete search history.

(56) References Cited

U.S. PATENT DOCUMENTS

| 5,954,510 A | 9/1999 | Merrill et al. |
| 6,259,988 B1 | 7/2001 | Galkowski et al. |
| 2002/0194046 A1 | 12/2002 | Sullivan et al. |
| 2003/0149614 A1 | 8/2003 | Andrus et al. |
| 2005/0282126 A1 | 12/2005 | Pesso |
| 2006/0147891 A1 | 7/2006 | Dreyfous et al. |

(Continued)

OTHER PUBLICATIONS

"U.S. Appl. No. 14/216,735, Final Office Action dated Sep. 22, 2017", 51 pgs.

(Continued)

*Primary Examiner* — James S McClellan
(74) *Attorney, Agent, or Firm* — Schwegman Lundberg & Woessner, P.A.

(57) ABSTRACT

Systems and techniques for mobile computer guided coaching are described herein. A selectable user interface element may be generated corresponding with a first activity. An points total may be calculated for a user of a mobile device. A number of times the selectable user interface has been selected over a period of time may be identified from a first activity history of the user. A first activity points value may be determined for the first activity. A new points total may be calculated for the user by summing the existing points total and the first activity points value. An indication of the first activity points value may be generated. An update to the selectable user interface element may be transmitted including an indication that the activity has been completed. A second selectable user interface element corresponding with a second activity may be transmitted upon expiration of a window of time.

21 Claims, 61 Drawing Sheets

(56) References Cited

U.S. PATENT DOCUMENTS

| | | | |
|---|---|---|---|
| 2007/0072156 A1 | 3/2007 | Kaufman et al. | |
| 2007/0198330 A1 | 8/2007 | Korenblit et al. | |
| 2007/0239520 A1 | 10/2007 | Collins | |
| 2013/0090171 A1* | 4/2013 | Holton | A63F 13/48 463/42 |
| 2013/0106684 A1* | 5/2013 | Weast | G06F 19/3481 345/156 |
| 2014/0322677 A1 | 10/2014 | Segal | |
| 2015/0347412 A1* | 12/2015 | Wolf | G06F 17/30699 707/749 |

OTHER PUBLICATIONS

"U.S. Appl. No. 14/216,735, Non Final Office Action dated Dec. 4, 2015", 29 pgs.

"U.S. Appl. No. 14/216,735, Appeal Brief filed Aug. 21, 2018", 48 pgs.

"U.S. Appl. No. 14/216,735, Response filed Jun. 6, 2016 to Non Final Office Action dated Dec. 4, 2015", 18 pgs.

"U.S. Appl. No. 14/216,735, Final Office Action dated Sep. 13, 2016", 34 pgs.

"U.S. Appl. No. 14/216,735, Response filed Dec. 13, 2016 to Final Office Action dated Sep. 13, 2016", 15 pgs.

"U.S. Appl. No. 14/216,735, Advisory Action dated Jan. 30, 2017", 5 pgs.

"U.S. Appl. No. 14/216,735, Response filed Feb. 13, 2017 to Advisory Action dated Jan. 20, 2017", 16 pgs.

"U.S. Appl. No. 14/216,735, Non Final Office Action dated Mar. 9, 2017", 37 pgs.

"U.S. Appl. No. 14/216,735, Response filed Jun. 9, 2017 to Non Final Office Action dated Mar. 9, 2017", 19 pgs.

Doerr, John, "Your 6-Step Guide to Setting and Achieving Sales Goals: You Can Get There From Here", Rain Selling Blog, [Online] retrieved from the internet: https://web.archive.org/web/20111017064640/http://www.rainsalestraining.com/blog/setting-and-achieving-sales-goals/, (Oct. 17, 2011).

* cited by examiner

FIG. 9

| Username | Name | Firm |
|---|---|---|
| AAA_Advisors | Anderson, Sara | Sara's Planning Firm |
| billh3 | Example, Advisor | Sample Financial Advisor |
| BillTest Firm | Houghton, Bill | Bill's Test Firm |
| chasw | Weaver, Chas | Chas Weaver and Associates |
| demo2 | Advisor, John | John's Retirement Planning |
| demo3 | Advisor, Jane | Jane's Financial Plans |
| DemoAdvisor | Advisor, Demo | ABC Financial Group |
| Ellena | Wilson, Ellena | ABC Retirement |
| growyourfirm | Johnson, Harold | Grow Your Firm LLC |
| Herzog | Herzog, Peter | ActFi Investment Consultants |
| jackw | Weaver, Jack | Jack Weaver Broker/Dealer |
| kchien2 | Chien, K | K Chien Ltd |
| peterb | Berman, Peter | Peter Berman & Co. Advisors,... |
| Strange | Range, Jeff | Strange Advice |
| TestAdvisor2 | AdvisorThree Test | Test Practice |

Recent Roadmaps — Last Week

| Name | Firm | Path | Created |
|---|---|---|---|

No Roadmaps Created within the last week

```
   Home  | ⊖ Manager Dashboard        ─1000
  ┌─────────┬──────────────┬───────────┬────────────┐
  │ Summary │ Client Details│ Reporting │ Access Keys│
  └─────────┴──────────────┴───────────┴────────────┘
  Show data for   Select All   Select None   ( Save changes )

☑ Favre
  ☐ Peterson ◄──1010
  ☑ Rice
  ☐ Williams
  ☑ Winfield
```

FIG. 10

1100 →
```
   Home  | ⊖ Manager Dashboard
  ┌─────────┬──────────────┬───────────┬────────────┐
  │ Summary │ Client Details│ Reporting │ Access Keys│
  └─────────┴──────────────┴───────────┴────────────┘
  ☑ Users  ☑ Maps Created
  [ Login As User ] [ Create New User ]       (18 users)  👁 [hide]
```

| Username | Name | Firm |
|---|---|---|
| .AAA_Advisors | Anderson, Sara | Sara's Planning Firm |
| billh3 | Example, Advisor | Sample Financial Advisor |
| BillTest Firm | Houghton, Bill | Bill's Test Firm |
| chasw | Weaver, Chas | Chas Weaver and Associates |
| demo2 | Advisor, John | John's Retirement Planning |
| demo3 | Advisor, Jane | Jane's Financial Plans |
| DemoAdvisor | Advisor, Demo | ABC Financial Group |
| Ellena | Wilson, Ellena | ABC Retirement |
| growyourfirm | Johnson, Harold | Grow Your Firm LLC |
| Herzog | Herzog, Peter | ActiFi Investment Consultants |
| jackw | Weaver, Jack | Jack Weaver Broker\Dealer |
| kchien2 | Chien, K | K Chien Ltd |
| peterb | Berman, Peter | Peter Berman & Co. Advisors,... |
| Strange | Range, Jeff | Strange Advice |
| TestAdvisor2 | AdvisorThree Test | Test Practice |

1105

1110 → Login                            [ Search ] ☒

FIG. 11

```
┌─────────────────────────────────────────────────┐
│  [ Summary ][ Client Details ][ Reporting ][ Access Keys ] │
│  ☑ Users  ☑ Maps Created                        │
│1240─[ Login As User ][ Create New User ]─1200   │
│                                                  │
│   Access Key  [ Favre       ▼ ]─1210            │
│                                                  │
│   Username   [ john_doe_advisor ]─1220          │
│                                                  │
│              ( Create )─1230                    │
└─────────────────────────────────────────────────┘
```

FIG. 12

| | Name | Firm | Path | Created | |
|---|---|---|---|---|---|
| 1300 | Name | Firm (1310) | Path (1320) | Created | 1330 |
| | Improve communications | Peter Berman & Co. Ad... | Growth > Enhance Your Ma... | Nov 5 | |
| | Improve staff productivity | ABC Retirement | Time > Increase Productivit... | Nov 5 | |
| | Reduce client service costs | Jack Weaver Broker\D... | Profit > Reduce Expenses... | Nov 5 | |

Recent Roadmaps — Last Week ▼ [hide]

Login ............ Search ─1340

FIG. 13

| Name | Firm | Name | AUM | Roadmaps | Last Roadmap | Logins | Last Login | Created |
|---|---|---|---|---|---|---|---|---|
| Advisor, Demo | ABC Financial Group | Peterson | $60,000,000 | 2 | Jan 7 | 4 | Nov 2 | Jun 7 |
| Advisor, Demo | ABC Financial Group | Peterson | $60,000,000 | 2 | Jan 7 | 4 | Nov 2 | Jun 7 |
| Advisor, Jane | Jane's Financial Plans | Williams | $30,000,000 | 4 | Jan 20 | 13 | Sep 29 | 08/28/2008 |
| Advisor, John | John's Retirement Planning | Peterson | $20,000,000 | 5 | Apr 21 | 14 | May 7 | 08/28/2008 |
| Advisor Three, Test | Test Practice | Favre | $30,000,000 | 1 | 05/18/2009 | 3 | Feb 2 | 05/13/2009 |
| Anderson, Sara | Sara's Planning Firm | Peterson | $20,000,000 | 5 | May 13 | 10 | Oct 21 | 08/28/2008 |
| Berman, Peter | Peter Berman & Co. Advisors, Inc.V™@ | Winfield | $1,000,000 | 11 | 01/08/2009 | 20 | 02/06/2009 | 06/06/2008 |
| Chien, K | K Chien Ltd | Favre | $20,000,000 | 3 | Jan 20 | 3 | Jan 20 | 07/22/2008 |
| Example, Advisor | Sample Financial Advisor | Rice | $50,000,000 | 2 | Jan 20 | 6 | Nov 2 | 03/09/2009 |
| Herzog, Peter | ActiFi Investment Consultants | Winfield | $32,000,000 | 8 | Sep 7 | 14 | Nov 2 | 07/17/2008 |
| Houghton, Bill | Bill's Test Firm | Favre | $50,000,000 | 4 | | 22 | Nov 2 | 07/29/2008 |
| Johnson, Harold | Grow Your Firm LLC | Favre | $0 | 1 | Jun 17 | 3 | Jun 17 | Apr 21 |
| Johnson, Thomas | TJ & Associates | Williams | $75,000,000 | 5 | Apr 21 | 5 | Apr 21 | 02/23/2009 |
| Range, Jeff | Strange Advice | Favre | $250,000,000 | 3 | Feb 3 | 4 | Apr 23 | Feb 2 |
| Weaver, Chas | Chas Weaver and Associates | Favre | $13,000,000 | 5 | Jan 20 | 5 | Feb 2 | 07/17/2008 |
| Weaver, Jack | Jack Weaver Broker/Dealer | Favre | $5,000,000 | 1 | 07/17/2008 | 3 | Jul 30 | 07/17/2008 |
| West, Sam | Sam's Test Planning | Favre | $50,000,000 | 4 | Jun 7 | 5 | Jun 7 | 05/19/2009 |
| Wilson, Ellena | ABC Retirement | Favre | $147,000,000 | 6 | Apr 20 | 54 | Nov 3 | 06/12/2008 |

```
┌─────────────────────────────────────────────┐
│ ⬡ Home  | ⊖ Manager Dashboard               │
│  ┌────────┬─────────────┬─────────┬────────┐│
│  │Summary │Client Details│Reporting│Access Keys││
│  ☑ Users  ☑ Maps Created                     │
│  ┌─────────────┬──────────────┐  1           │
│  │Login As User│Create New User│              │
│  └─────────────┴──────────────┘              │
│        ╲1828       ╲1820                     │
│   Access Key [Favre      ▽]  2               │
│                  ╲1822                       │
│   Username [john_doe_advisor]  3             │
│                   ╲1824                      │
│            ( Create )  4                     │
│                ╲1826                         │
└─────────────────────────────────────────────┘
```

FIG. 22

| Summary | Client Details | Reporting | Access Keys |

☑ Users  ☑ Maps Created                                   (18 users) 👁 [hide]

1828 — | Login As User | Create New User |
                 5

| Username | Name | Firm |
|---|---|---|
| .AAA_Advisors | Anderson, Sara | Sara's Planning Firm |
| billh3 | Example, Advisor | Sample Financial Advisor |
| BillTest Firm | Houghton, Bill | Bill's Test Firm |
| chasw | Weaver, Chas | Chas Weaver and Associates |
| demo2 | Advisor, John | John's Retirement Planning |
| demo3 | Advisor, Jane | Jane's Financial Plans |
| DemoAdvisor | Advisor, Demo | ABC Financial Group |
| Ellena | Wilson, Ellena | ABC Retirement |
| growyourfirm | Johnson, Harold | Grow Your Firm LLC |
| Herzog | Herzog, Peter | ActiFi Investment Consultants |
| jackw | Weaver, Jack | Jack Weaver Broker\Dealer |
| 1830 — john_doe_advisor  6 |  |  |
| kchien2 | Chien, K | K Chien Ltd |
| peterb | Berman, Peter | Peter Berman & Co. Advisors,... |

1832 — | Login  7 |                              [Search]  ☒

| Summary | Client Details | Reporting | Access Keys | — 1845 |

☑ Users  ☑ Maps Created

| Login As User | Create New User |                    (18 users) 👁 [hide]

| Username | Name | Firm |
|---|---|---|
| .AAA_Advisors | Anderson, Sara | Sara's Planning Firm |
| billh3 | Example, Advisor | Sample Financial Advisor |
| BillTest Firm | Houghton, Bill | Bill's Test Firm |
| chasw | Weaver, Chas | Chas Weaver and Associates |
| demo2 | Advisor, John | John's Retirement Planning |
| demo3 | Advisor, Jane | Jane's Financial Plans |
| DemoAdvisor | Advisor, Demo | ABC Financial Group |
| Ellena | Wilson, Ellena | ABC Retirement |
| growyourfirm | Johnson, Harold | Grow Your Firm LLC |
| Herzog | Herzog, Peter | ActiFi Investment Consultants |
| jackw | Weaver, Jack | Jack Weaver Broker\Dealer |
| john_doe_advisor | | |
| kchien2 | Chien, K | K Chien Ltd |
| peterb | Berman, Peter | Peter Berman & Co. Advisors,... |

Login  1 — 1847                                Search

| Summary | Client Details | Reporting | Access Keys |

☑ Users  ☑ Maps Created

[ Login As User ] [ Create New User ]  ─ 1890          (18 users)  👁  [hide]

| Username | Name | Firm |
|---|---|---|
| .AAA_Advisors | Anderson, Sara | Sara's Planning Firm |
| billh3 | Example, Advisor | Sample Financial Advisor |
| BillTest Firm | Houghton, Bill | Bill's Test Firm |
| chasw | Weaver, Chas | Chas Weaver and Associates |
| demo2 | Advisor, John | John's Retirement Planning |
| demo3 | Advisor, Jane | Jane's Financial Plans |
| DemoAdvisor | Advisor, Demo | ABC Financial Group |
| Ellena | Wilson, Ellena | ABC Retirement |
| growyourfirm | Johnson, Harold | Grow Your Firm LLC |
| Herzog | Herzog, Peter | ActiFi Investment Consultants |
| jackw | Weaver, Jack | Jack Weaver Broker\Dealer |
| john_doe_advisor | | |
| kchien2 | Chien, K | K Chien Ltd |
| peterb | Berman, Peter | Peter Berman & Co. Advisors,... |

Login 1 ─ 1892                          [ Search ] ☒

| Roadmaps | Goal Progress | Progress History |

⏱ Progress History — 1908

| Date | Type | Name |
|---|---|---|
| Jun 8, 2009 | Roadmap Update | Grow AUM — 1910 |
| Jun 4, 2009 | Roadmap Update | Grow AUM — 1912 |
| Jun 4, 2009 | Roadmap Update | Client Satisfaction |

↙ 1914

Grow AUM
Roadmap Path: Growth > Increase AUM > Increase AUM from Existing Clients
Overall Goal Progress: 10%
Overall Goal Notes: Landed 4 new clients totaling $400,00 in AUM.

Define which stock option strategies you will implement
- Task Progress: 0%
- Goal: This is my strategy ...
- Milestone: Sep 4, 2009
- Assigned To: Tina Smith Date by which you will create a plan for additional services you can add to your offering
- Task Progress: 0%
- Milestone: Sep 4, 2009
- Assigned To: Tina Smith

FIG. 36

| Roadmaps | Goal Progress | Progress History |

Progress History

| Date | Type | Name |
|---|---|---|
| Jun 8, 2009 | Roadmap Update | Grow AUM — 1910 |
| Jun 4, 2009 | Roadmap Update | Grow AUM — 1912 |
| Jun 4, 2009 | Roadmap Update | Client Satisfaction |

1916

Grow AUM
Roadmap Path: Growth > Increase AUM > Increase AUM from Existing Clients
Overall Goal Progress: 20%
Overall Goal Notes: Landed 7 new clients totaling $800,00 in AUM.

Define which stock option strategies you will implement
- Task Progress: 25%
- Goal: This is my strategy ...
- Milestone: Sep 4, 2009
- Assigned To: Tina Smith
- Task Notes: Initial draft of stock option strategy is complete.

Date by which you will create a plan for additional services you can add to your offering
- Task Progress: 50%
- Milestone: Sep 4, 2009
- Assigned To: Tina Smith
- Task Notes: All services have been defined and agreed upon by management.

FIG. 37

Home | 🔖 My Roadmaps                                                                        ? Contact Support | Logout

| Roadmaps | Goal Progress | Progress History | Create Plan | Create Agenda |

🗂 Business Plan Generator

Select Objectives

Select the objectives you would like to show on the report:                                    [Refresh]

| Add | Name | Area | Goal | Focus | Goal Date | Goal Target (if applicable) | Progress |
|-----|------|------|------|-------|-----------|------------------------------|----------|
| ☑ | Increase retention | Growth | Increase revenue | Obtain New Clients | 02/05/2011 | $100,000 | |
| ☑ | Credentials | Expertise | Client Expertise | Develop Your Credentials | Apr 20 | | |
| ☑ | Increase retention | Growth Profit | Increase revenue | Increase Retension | 07/17/2009 | $30,000 | 10% |
| ☐ | test inc rev | Growth | Increase revenue | Increase AUM from Existing Clients | 07/28/2009 | $12,121,212 | 10% |
| ☑ | shift fixed costs to variable | Profit | Reduce Expenses | Shift Fixed Costs to Variable | 07/17/2009 | $30,000 | 65% |
| ☐ | systematization | Time | Fewer Hours | Systematize your Client Service Process | 07/17/2009 | 8 | 25% |

( Next )

Customized Content

FIG. 38

Home | My Roadmaps | ? Contact Support | Logout

| Roadmaps | Goal Progress | Progress History | Create Plan | Create Agenda |

Agenda Generator — 1932

Agenda Type: ● Create Quick Agenda — 1934    ○ Create Custom Agenda — 1936

Select Agenda Items

Include Goals with status: ☑ Active  ☐ Completed  ☐ On Hold

Overdue Goals: ☑ Exclude Overdue Goals

Date Range: [Agenda for next 14 days ▼] (0 Items)

FIG. 40

| My Data | My Results | | | | | settings |
|---|---|---|---|---|---|---|
| Actual ▼ 2010 ▼ | Create New Entry | Save As New Entry 1962 | | | | Delete Year |
| | | Save Changes | | | | |

Summary

| | Q1 | Q2 | Q3 | Q4 | Year End |
|---|---|---|---|---|---|
| AUM | | | | | |
| New AUM | | | | | |
| Total Revenue | | | | | |
| Direct Expense | | | | | |
| Overhead Expense | | | | | |
| Direct Client Impact Team Members FTE | | | | | |
| Total Team Members FTE | | | | | |
| Ending Number of Billing Relationships | | | | | |

AUM / Production Indicators
AUM Breakdown
Income Statement Indicators - Quarterly
Return Indicators
Payroll Indicators
Team Member Statistics
Income Statement Indicators - Annual
Balance Sheet - Annual
Client Metrics - Annual

| My Data | My Results | | | | | |
|---|---|---|---|---|---|---|
| Reporting | Charting | Custom Comparisons | | | Data Dump | What does this mean? | settings |

Custom Comparisons Options
☑ Export Calculations ☑ Export Empty Rows
☐ Export Selected Rows to PDF — 1992

| | My Actual 2009 Year-End Data | My Plan 2009 Year-End Data | Variance | My Actual 2008 Year-End Data | Variance | show |
|---|---|---|---|---|---|---|
| Summary ☑ | | | | | | |
| AUM ☑ | $131,750,000 | $132,000,000 | -$250,000 | $119,000,000 | $12,750,000 | |
| New AUM ☑ | $30,500,000 | $27,000,000 | $3,500,000 | $29,000,000 | $1,500,000 | |
| Total Revenue ☑ | $1,098,180 | $1,119,000 | -$20,820 | $1,086,500 | $11,680 | |
| Direct Expense ☑ | $439,272 | $447,600 | -$8,328 | $434,600 | $4,672 | |
| Overhead Expense ☑ | $549,090 | $559,500 | -$10,410 | $543,250 | $5,840 | |
| Direct Client Impact Team Members FTE ☑ | 3.50 | 3.00 | 0.50 | 3.50 | 0.00 | |
| Total Team Members ☑ | 9.00 | 7.50 | 1.50 | 8.00 | 1.00 | |
| Ending Number of Billing Relationships ☑ | 214 | 219 | -5 | 207 | 7 | |
| Revenue per Direct Client Impact Team Members FTE ☑ | $313,766 | $373,000 | -$59,234 | $310,429 | $3,337 | |
| Revenue per Team Member FTE ☑ | $122,020 | $149,200 | -$27,180 | $135,813 | -$13,792 | |
| Revenue per Billed Relationship ☑ | $5,132 | $5,110 | $22 | $5,239 | -$117 | |
| AUM per Billed Relationship ☑ | $615,654 | $602,740 | $12,914 | $574,879 | $40,775 | |

FIG. 49

SYSTEMS AND METHODS FOR MOBILE COMPUTER GUIDED COACHING

CLAIM OF PRIORITY

This patent application claims the benefit of priority to U.S. Provisional Patent Application Ser. No. 62/153,275, entitled "SYSTEMS AND METHODS FOR MOBILE COMPUTER GUIDED COACHING," filed on Apr. 27, 2015, which is hereby incorporated by reference herein in its entirety.

TECHNICAL FIELD

The present subject matter relates to the field of training, and more specifically, but without limitation to, mobile computer guided coaching.

BACKGROUND

Online education is growing rapidly. Many universities now offer or have plans to develop its own set of MOOCs (Massive Open Online Courses), and there are now hundreds of MOOCs from universities all over the world. These MOOCs have already served millions of students, enabling anyone with an Internet connection to receive a world-class education. Similarly, online or more generally computer assisted or guided coaching outside the academic realm also holds great promise to enhance the skills of the workforce in ever more efficient and effective ways. Unfortunately, in environments where the principal purpose of the education or coaching is not academic achievement and particularly where the need to improve performance is not acute, traditional online educational approaches may be ineffective for most individuals.

BRIEF DESCRIPTION OF THE DRAWINGS

Some embodiments are illustrated by way of example and not limitation in the figures of the accompanying drawings in which:

FIGS. 9 to 57 illustrate various GUI interfaces, systems and methods, according to an example embodiment.

DEFINITIONS

Real-time: as used herein, the term "real-time" is used to refer to calculations or operations performed on-the-fly as events occur or input is received by the operable system. However, the use of the term "real-time" is not intended to preclude operations that cause some latency between input and response, so long as the latency is an unintended consequence induced by the performance characteristics of the machine.

User: as used herein, the term "user" generally refers to any person who accesses a coaching website, server or system, uses a communications device or service communicating with the coaching server or system, or engages in any other electronic interaction with the coaching system.

DETAILED DESCRIPTION

Online education is growing rapidly. Many universities now offer or have plans to develop its own set of MOOCs (Massive Open Online Courses), and there are now hundreds of MOOCs from universities all over the world. These MOOCs have already served millions of students, enabling anyone with an Internet connection to receive a world-class education. Similarly, online or more generally computer assisted or guided coaching outside the academic realm also holds great promise to enhance the skills of the workforce in ever more efficient and effective ways. Unfortunately, in environments where the principal purpose of the education or coaching is not academic achievement and particularly where the need to improve performance is not acute, traditional online educational approaches may be ineffective for most individuals.

Figure 1:
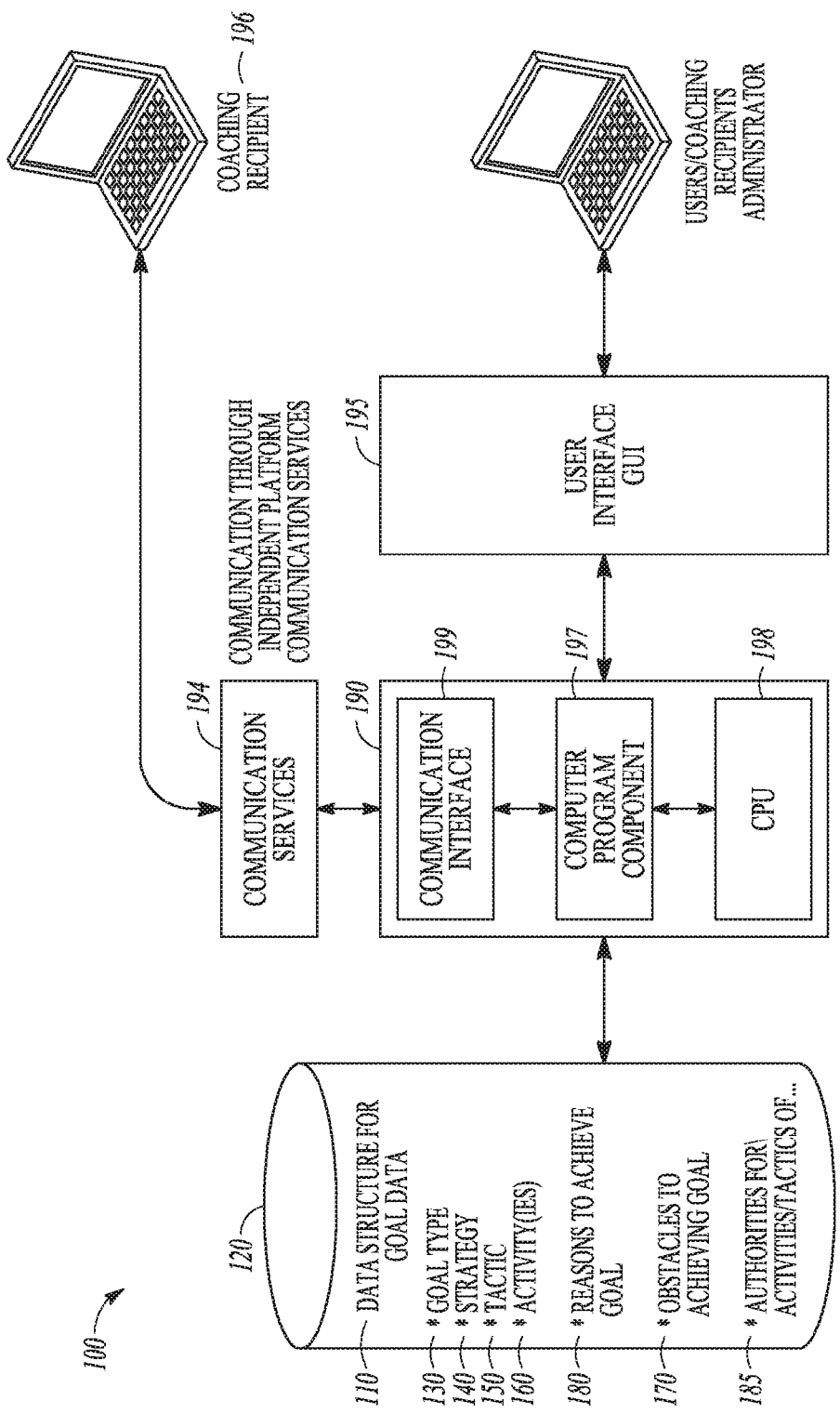
FIGS. 1 to 8 illustrate various embodiments of the method and apparatus, according to an example embodiment.

Example systems and methods for providing online or computer assisted or guided coaching are described. In the following description, for purposes of explanation, numerous specific details are set forth in order to provide a thorough understanding of example embodiments. It will be evident, however, to one skilled in the art that the present invention may be practiced without these specific details. Referring now to FIG. 1, there is illustrated an example overview of the computer guided coaching system 100 according to one example embodiment. In this example embodiment, there is provided a computerized coaching system for creating, structuring, storing, and tracking goal information, and providing coaching content and interactivity with a user. In one example embodiment, coaching is delivered to a recipient based on a goal that the recipient seeks to achieve. As used herein, the term "goal" defines a "general" or "high level" result a coaching recipient seeks to attain, wherein the result can be achieved in a multitude of different ways. In general, the system described herein provides a data structure 110, data storage 120, computer programs and computing system 190, user interface and communications with system users 194 and 195 and the coaching recipient 196 that breaks down a high level goal into activities that the coaching recipient can perform in relatively short periods of time. According to one example embodiment, a "short" period of time is approximately one hour of time or less. In one example a user interface and data structure, there is provided a hierarchy that includes: a) a goal 130, b) a strategy to achieve the goal 140, c) objectives 150, also referred to as tactics, to achieve the strategy, d) and activities 160, typically defined as tasks, to achieve the objectives. In addition, in this example embodiment, the data structure further includes: a) one or more obstacles to achieving the goal 170 and b) one or more personal benefits 180, i.e. reasons, for achieving the goal. Further, the data structure further includes one or more sources of authority 185 for the effectiveness of performing one or more of the activities associated with a strategy/tactic. Still further, the data structure includes one or more reasons why a recipient of the coaching may not be able to complete one or more of the activities, such as, but not limited to, an inability to find the time, lack of knowledge or skills or resource needed to perform the activity, a lack of motivation to perform the activity, or a health problem interfering with the ability to perform the activity.

Figure 2:
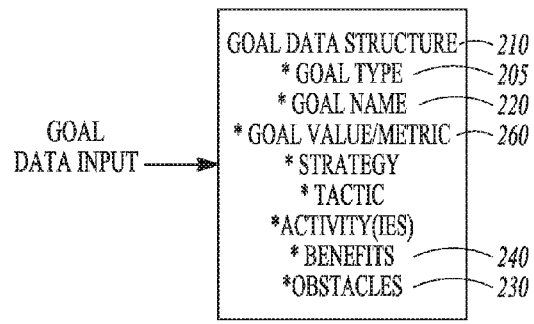

As illustrated in the overview of FIG. 1, the system further includes one or more computer program components 197 operative on a computing system 190 including a CPU 198 capable of executing program instructions, to configure the computing system to: a) operate in one or more modes, wherein each mode provides a different combination of operating capabilities; b) provide the graphical user interface (GUI) 195; and c) receive input through the GUI 195 utilizing one or more communications interfaces 199, to create a recipient-specific goal data unit. As shown in FIG. 2 in some examples, the recipient specific data unit includes: i) a working name for the goal 220; ii) a goal type for the goal 205 iii) at least one value or parameter for the goal type 260; iv) one or more obstacles for the goal 230; and v) one or more personal benefits 240 for achieving the goal.

Figure 3:
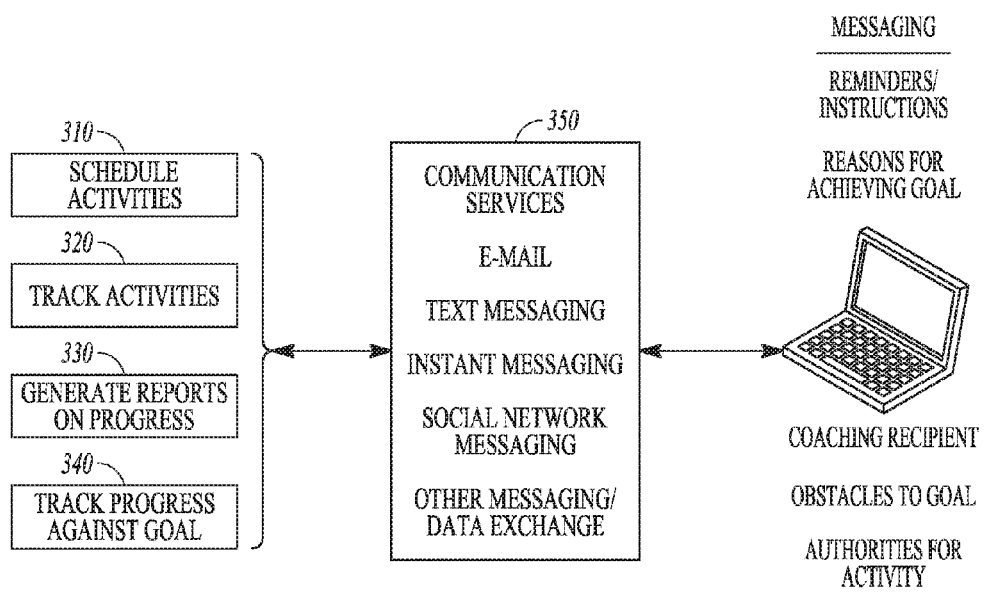

In addition, in this example embodiment, as illustrated in FIG. 3, the computer assisted coaching system includes one or more computer program components executable to configure the computing system to: a) schedule activities to be performed by the individual based on the goal data unit 310, wherein the schedule specifies a time or time frame for performance of the tasks; b) track activities performed by an individual based on goal unit data 320; c) generate reports showing progress against the activities 330; and d) track progress against the goal being pursued by the individual 340 and generate reports showing progress against the goal 330.

Further, in this example embodiment, the computer assisted coaching system includes an interface with one or more communication systems 350 independent of the system, wherein the one or more communication systems are selected from the group: an e-mail service, an instant message service, a text messaging service, and an electronic calendaring service. Further, the one or more program components execute on the computing system to send communications through the interface and the one or more independent communication systems to the recipient. According to one example embodiment, the communications to the recipient include one or more of the following communications obtained from the recipient-specific goal data unit: a) one or more reminders or instructions to perform tasks associated with the type of goal; or b) one or more reasons for achieving the goal; c) one or more obstacles to achieving the goal; and d) one or more authorities for why the activities to be performed are effective for achieving the tactic, and accordingly the objective and goal.

Figure 4:
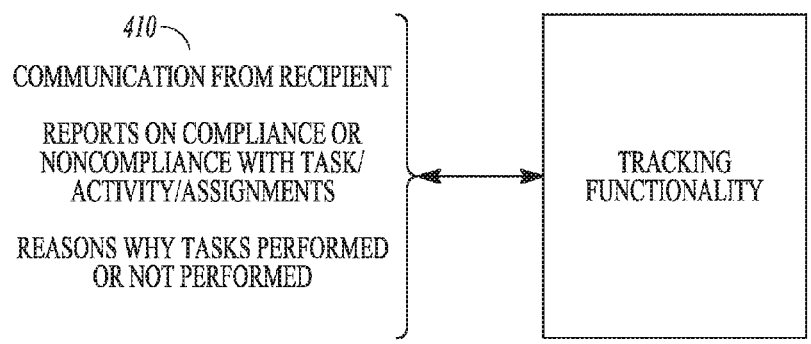

Furthermore, as illustrated in FIG. 4, the system is configured by the one or more computer programs to receive communications through the interface 410 and the independent communication systems from the recipient of the coaching, wherein the communications from the individual originate from one or more of the independent communication systems and include one or more of the following: a) one or more reports from the individual regarding the performance or nonperformance of tasks associated with the type of goal specified in the goal data unit; and/or b) one or more reasons why the tasks were not performed, and/or performed, in a timely fashion.

Figure 5:
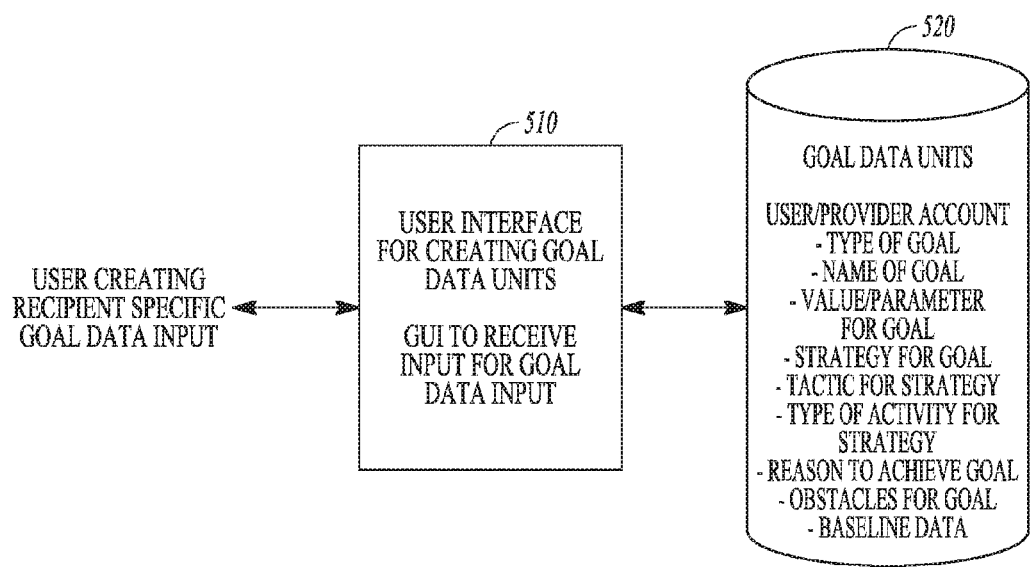

According to one example embodiment illustrated in FIG. 5, the coaching system includes a first interface 510 that is adapted to creating and defining goal data units specifically for a particular coaching recipient. For the purpose, the system includes a private, independent account for each coaching recipient, and the recipient-specific goal data units are associated with one or more, but typically only one, account for the coaching recipient. The first interface provides a GUI that is used by a system user, which may or may not be the coaching recipient, to create and define a goal data unit 520 for a user. Using this interface, an example of which is described in more detail below, a user can interact with structured, e.g. work-flow enabled, GUI to select predefined choices created for each of the following inputs to a goal data unit: a) choose a type of goal, and specify (input by soft or hard keypad) a user-specified name for the goal); b) select and/or specify a value, parameter or metric to achieve for the goal, from a predetermined or predefined set of options (such as a percentage to increase performance, or a value to attain to increase performance); c) select and/or specify a particular strategy to achieve the goal from a predetermined or predefined set of options; d) select and/or specify a particular objective/tactic to achieve the strategy from a predetermined or predefined set of options; e) select and/or specify a particular type of activity to achieve the objective/tactic from a predetermined or predefined set of options; f) select and/or specify more reasons for achieving the goal from a predetermined or predefined set of options; g) select and/or specify one or more obstacles to achieving the goal from a predetermined or predefined set of options; and h) optionally specify baseline data for a level of past performance against which future improvement in performance can be measured. In one example embodiment, only predefined or system determined choices are offered to the user when creating a goal data unit for a coaching recipient. In another example embodiment, the user can create new types of goals, new types of strategies, new types of objectives/tactics, and new types of activities, and add those to the system's predefined or predetermined choices for the same or other users in the future.

Figure 6:
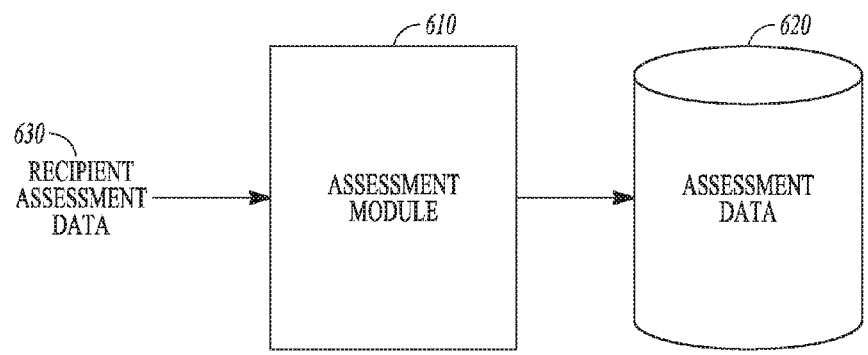

As illustrated in FIG. 6, the system further includes an assessment module 610 that is used to collect information 630 on the preferences, capabilities, biases, predilections, life goals, hopes, family objectives and other characteristics of a coaching recipient, which is stored in a recipient data structure or profile 620. This data can be used for the purpose of assisting in the coaching of the recipient, in the creation of goal data structures for the recipient, and for delivering coaching and handling coaching interactions. For example, in one example embodiment, the system offers choices in the goal creation process illustrated with respect to FIG. 5 based on at least in part the personal profile established by the assessment module.

Figure 7:
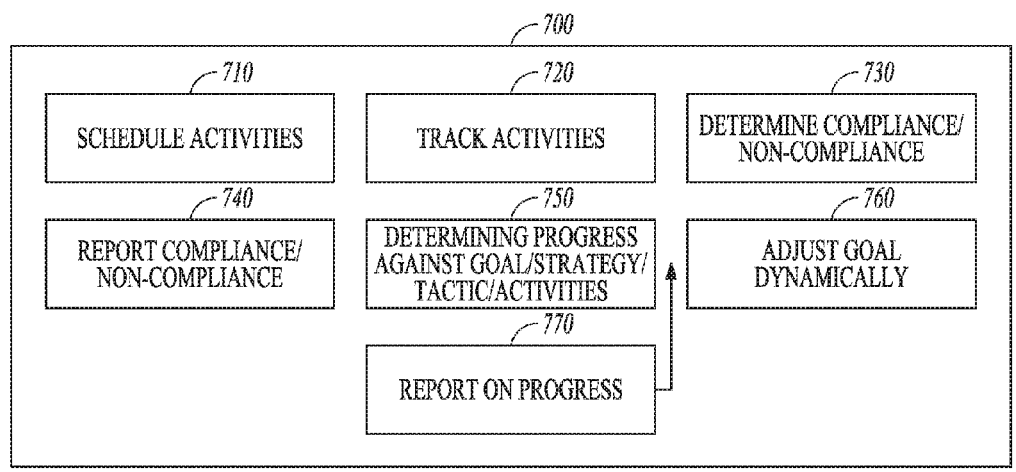

Referring now to FIG. 7, there is illustrated the configuration and operation of the coaching module or engine 700 of the computer system for using, modifying and adding to the data structures described above for the purpose of coaching a coaching recipient, wherein the configuration and operation is achieved with the one or more computer program components. As illustrated in FIG. 7, the coaching module 700 is responsive to a recipient-specific goal data structure includes the ability to: a) schedule activities 710, or more specifically tasks, to be performed by the individual based on the goal data unit, wherein the schedule specifies a particular date and time or date/time frame, for example optionally with or in the alternative a deadline, for performance of the tasks; b) track activities performed by the recipient 720, c) determine compliance or non-compliance, i.e. success or failure in completing assigned activities 730; d) report on compliance/non-compliance with respect to assigned activities 740; e) determine progress against the goal, or the strategy, or the tactic being pursued by the recipient 750; f) report on progress against the goal, or the strategy, or the tactic being pursued by the recipient 770; and g) optionally adjust the goal dynamically if the progress is below a threshold either predetermined prior to starting work on the goal, or determined dynamically as the goal is being pursued 760.

Figure 8:
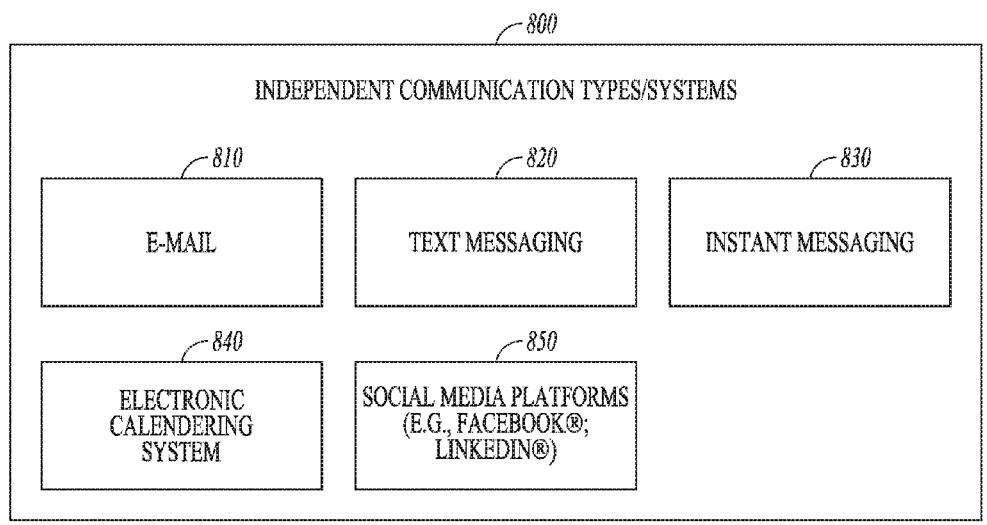
Figure 14:
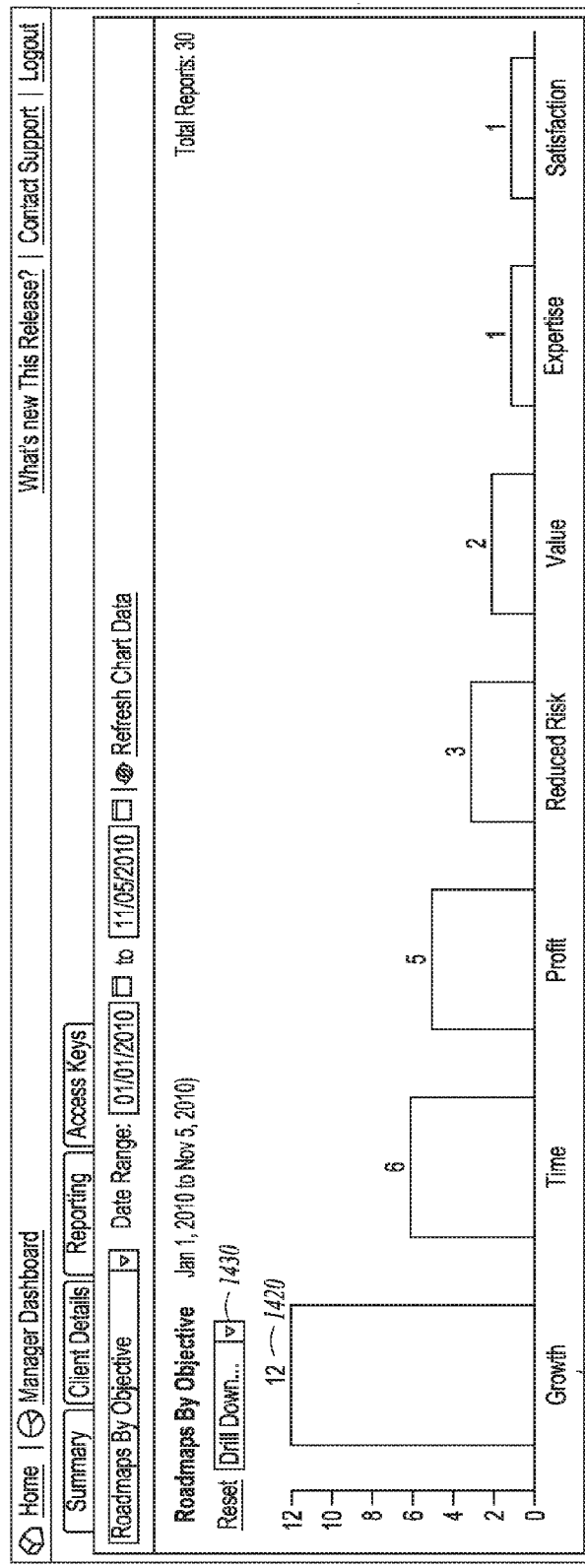

According to one example embodiment, illustrated in FIG. 8, the one or more communication systems independent of the system are selected from the group: an e-mail service 810, an instant message service 830, a text messaging service 820, and an electronic calendaring service 840. According to another example embodiment, the communication systems independent from the recipient are communication systems or services that have general utility for the user and are used for various types of communications such as general business or general pleasure, and are not dedicated to use for interacting or communicating with the coaching system. Accordingly using these independent systems to communicate with the recipient, the recipient can receive coaching and send feedback and reports to the coaching system all without directly using a coaching system interface, such as by visiting a coaching web site, running a coaching program on their hand held, mobile, laptop or desk-top computer. In one alternative, the messaging service may be integrated as part of program, web interface or utility used by the coaching recipient for other purposes, such as a mobile social media app (e.g., a Facebook® app), or a social media web site 850. In still another embodiment, the coaching recipient does not need to log on to a web site or application, or install any application dedicated for the coaching system.

Referring now to FIGS. 9 to 48, there is illustrated a first example embodiment of a GUI for use by users seeking to administer or use the system described above. In the example embodiment of the GUI described hereinafter, the coaching system is adapted to coach individuals at a financial planning practice. The system, however, may also be applied to coach individuals to achieve other types of educational, vocational, career, business, athletic or any other type of goal. However, the system is particularly adapted in this embodiment for an individual to attain a business goal. GUI A 900 is a manager dashboard that allows a manager or other administrator to establish accounts for coaching recipients that belong to individual financial planning practices, and provides access to logins and recipient-specific goals, referred to as "Roadmaps" in the example GUI herein. The Roadmaps or goals are associated with individual practices. The GUI A also provides access to aggregate metrics for Roadmap objectives and usage. GUI A is, in this example embodiment, the main manager dashboard screen. As illustrated in FIG. 10, Roadmap users and data are organized by "keys." Each coach has access to his or her own key and may have access to other coaches' keys, as appropriate. Coaches may, in one example embodiment, only be able to see the keys that they have access to. In addition to organizing and limiting access to coaching recipients, in this case financial advisors, the access key functionality allows the user to view data on the manager dashboard by individual keys or combinations of keys. To filter a manager dashboard by key, go to the "Access Keys" tab 1000 and select or de-select keys and click on "Save Changes."

As shown in the GUI of FIG. 11, the "Summary" section 1100 of the manager dashboard is used to log in as an existing user, or to create a new user. To log in as an existing advisor, a user selects the advisor from the list 1105 and clicks the "Login" link 1110—a new browser window is launched and the user is logged in on behalf of the advisory firm.

As shown in the GUI of FIG. 12, to set up a new user in Roadmap, the user employs the "Create New User" tab 1200. The user selects the access key (e.g., using drop down menu 1210) in which the practice should be included, assigns a username, and clicks "Create" 1230, then goes back to the "Login As User" tab 1240, selects the new username and clicks the "Login" link—a new browser window is launched and the user is logged in on behalf of the new advisory firm.

The GUI of FIG. 13 illustrates a shortcut to find recently created roadmaps. By clicking on the column headings (1300-1330), the user can sort by the name of the saved Roadmap report, the name of the firm, the path of the Roadmap, or the date the Roadmap was created. The user can also use the search capabilities of this section by entering key word(s) in the text box 1340 next to "Search."

The GUI's of FIGS. 14 to 17 is the "Reporting" tab of the Manager Dashboard, where the user can view which Roadmap high, medium or low level objectives the advisors are selecting, wherein high level objectives are high level goals as defined above, mid level objectives are strategies, and low level objectives are tactics, as those terms are used hereinabove. The user can drill down from high-level objectives to mid-level objectives to detailed-level objectives. This will help the user, in this example a coach for the advisors, to focus on the business needs that are most common among the advisors the user/coach support. In the GUI view of FIG. 14, the user can see that "Growth" 1410 is the most common high-level business objective.

Figure 15:
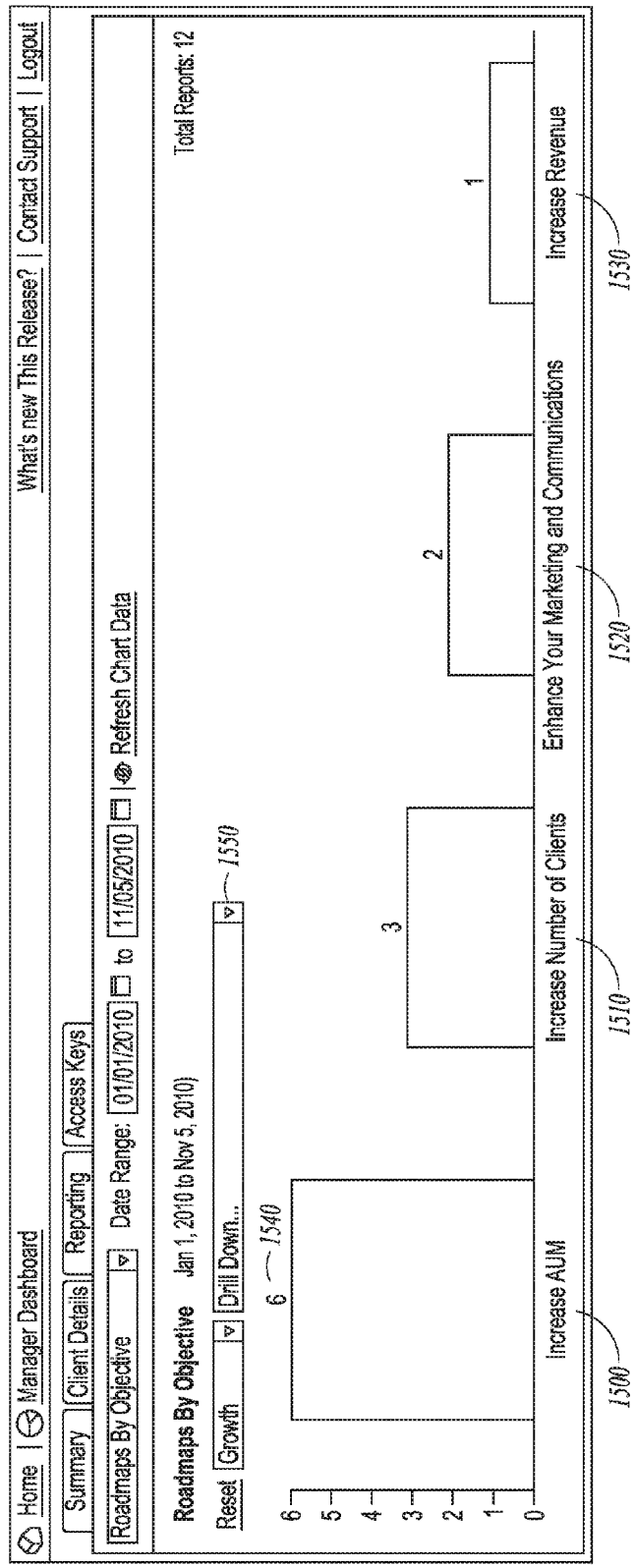

By clicking on the bar 1420 above "Growth" (or using the Drill Down menu 1430) the user get to the screen of FIG. 15, which shows the user which mid-level objectives under "Growth" were selected by advisors or users setting up goals (1500-1530). In this example, "Increase AUM" 1500 is the most common mid-level growth objective.

Figure 16:
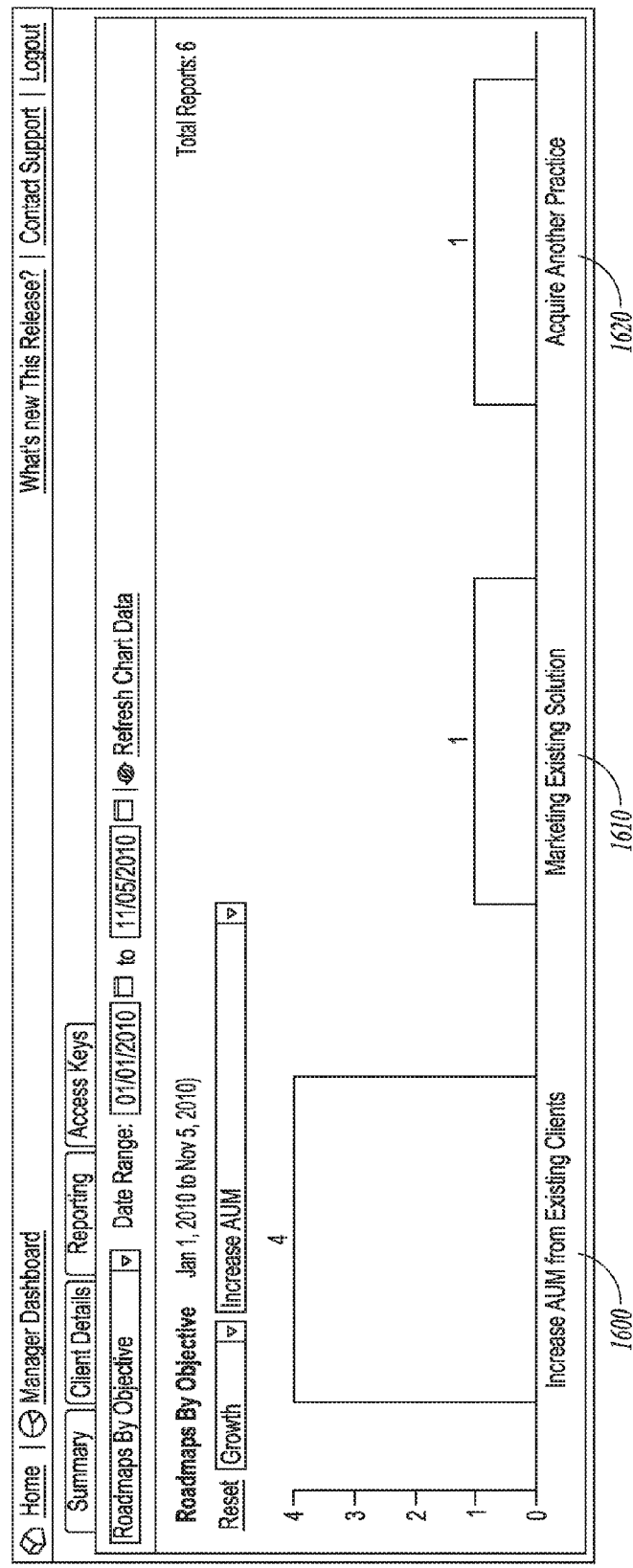

By clicking on the bar above "Increase AUM" 1540 (or using the Drill Down menu 1550) the user gets to the GUI of FIG. 16, which shows the user which detailed-level objectives 1600-1620 under "Increase AUM" were selected. In this example, "Increase AUM from Existing Clients" 1600 is the most common detailed-level objective.

Figure 17:
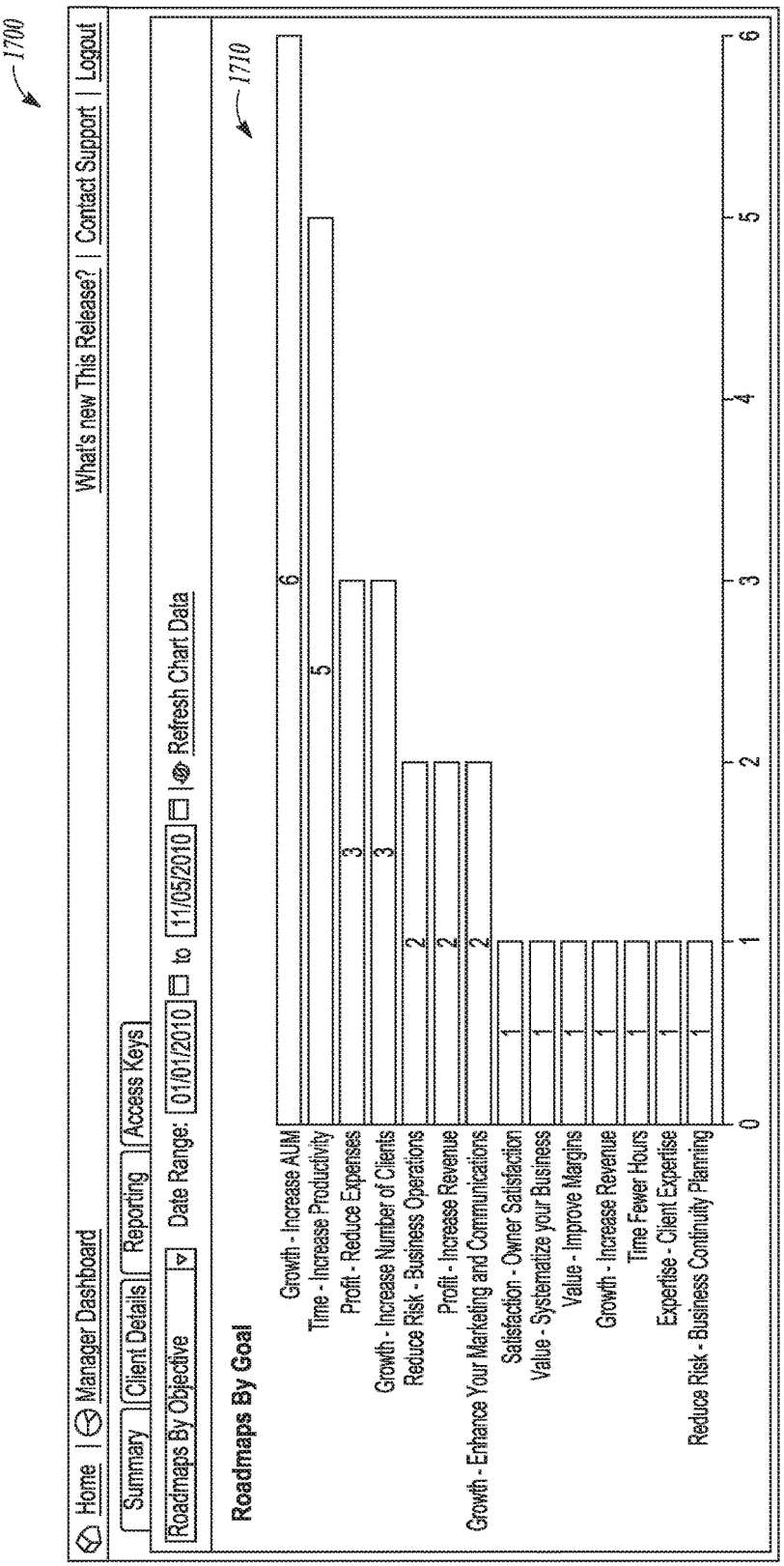
Figure 18:
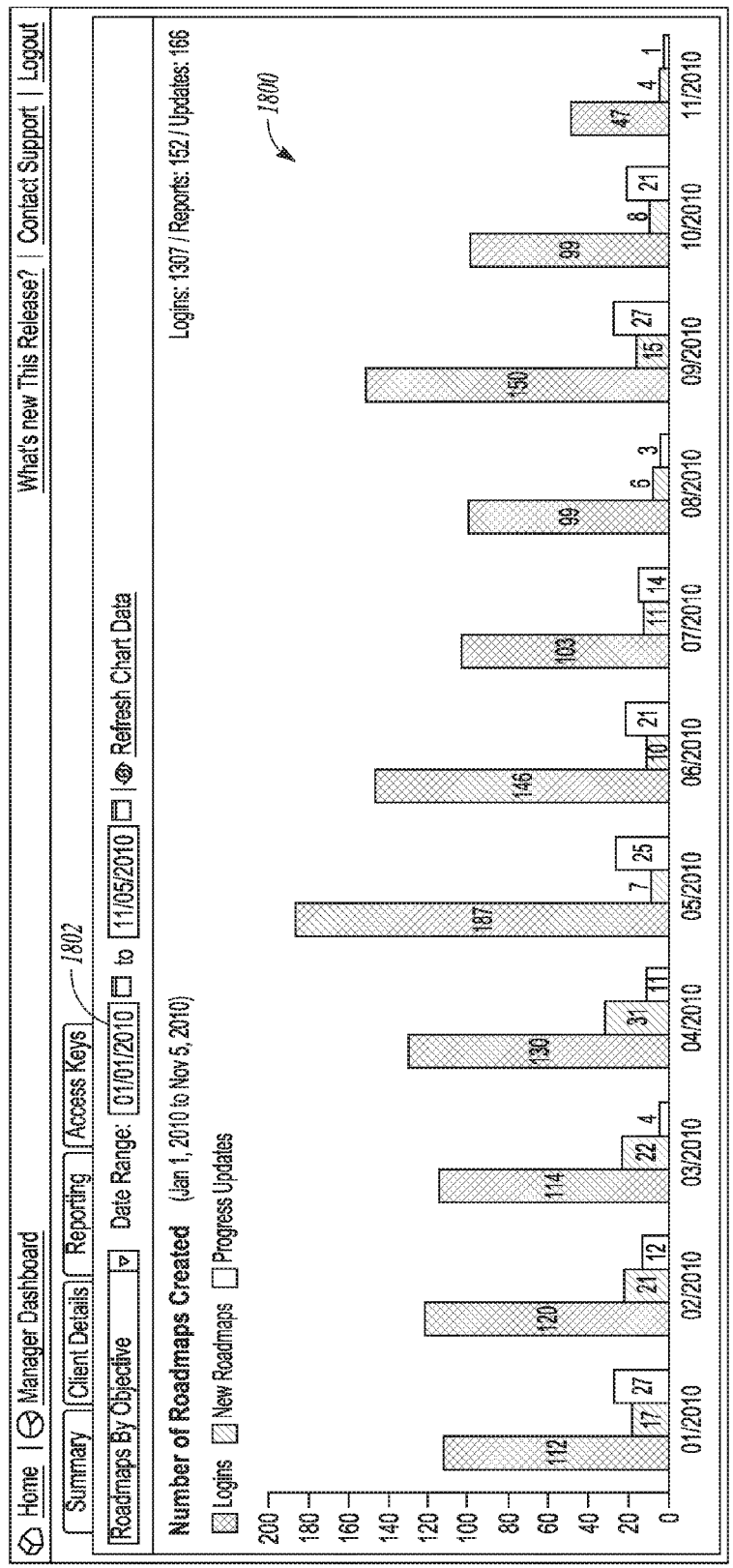

Another view of the mid-level objectives is available in the "Roadmaps by Goal" report 1700 on the lower-half of the screen. The report shown in the GUI of FIG. 17 gives the top high-level/mid-level objective combinations 1710 that were selected.

Figure 19:
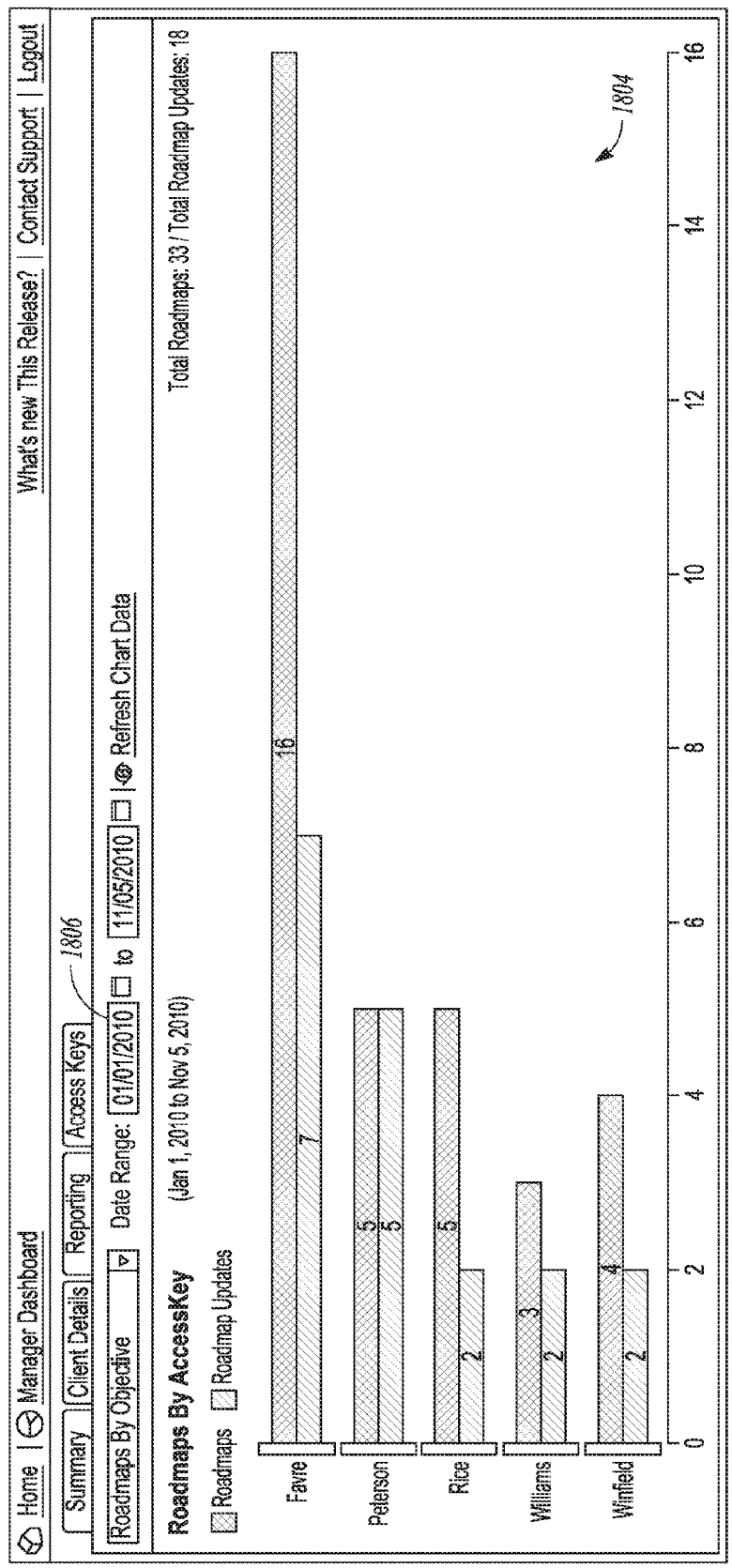
Figure 27:
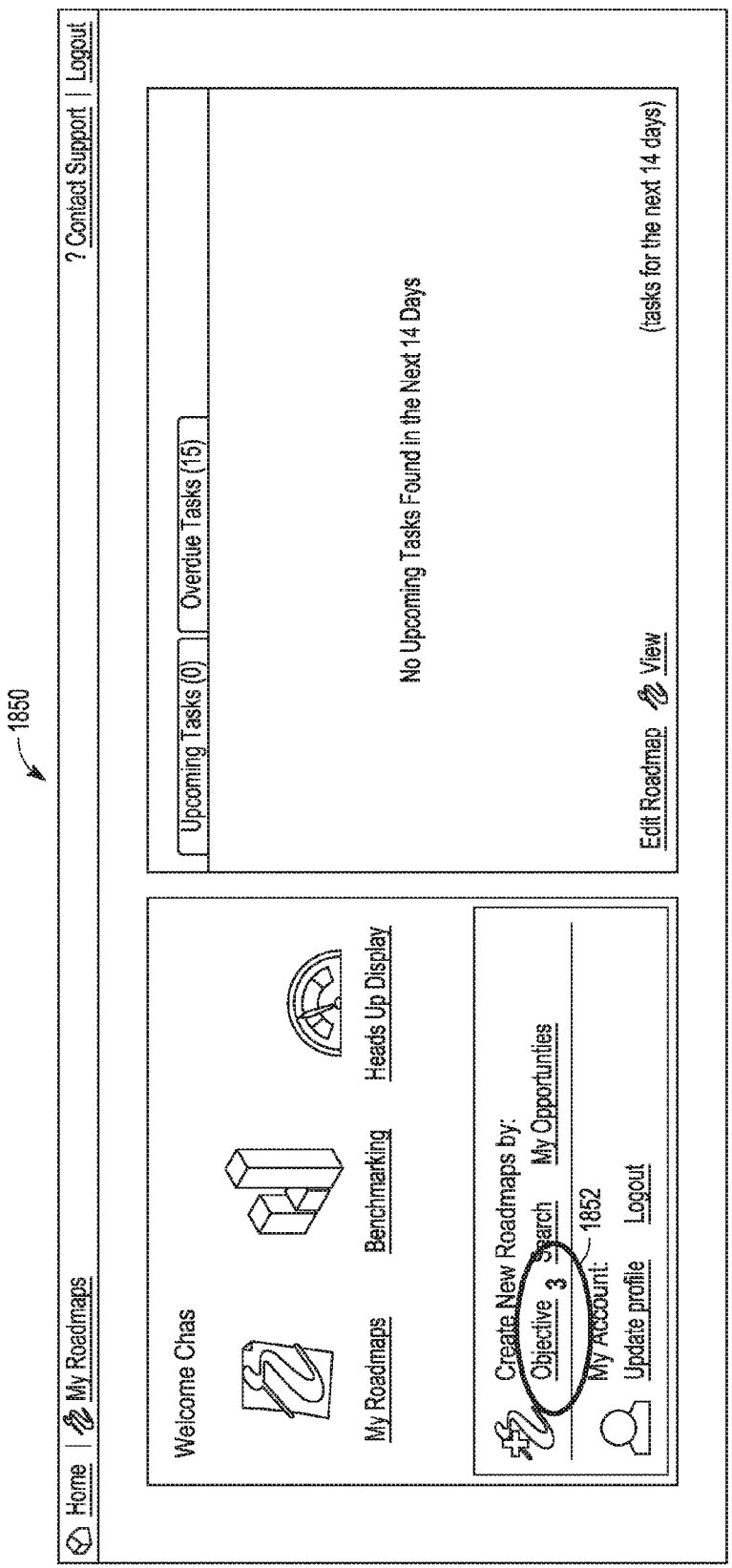
Figure 33:
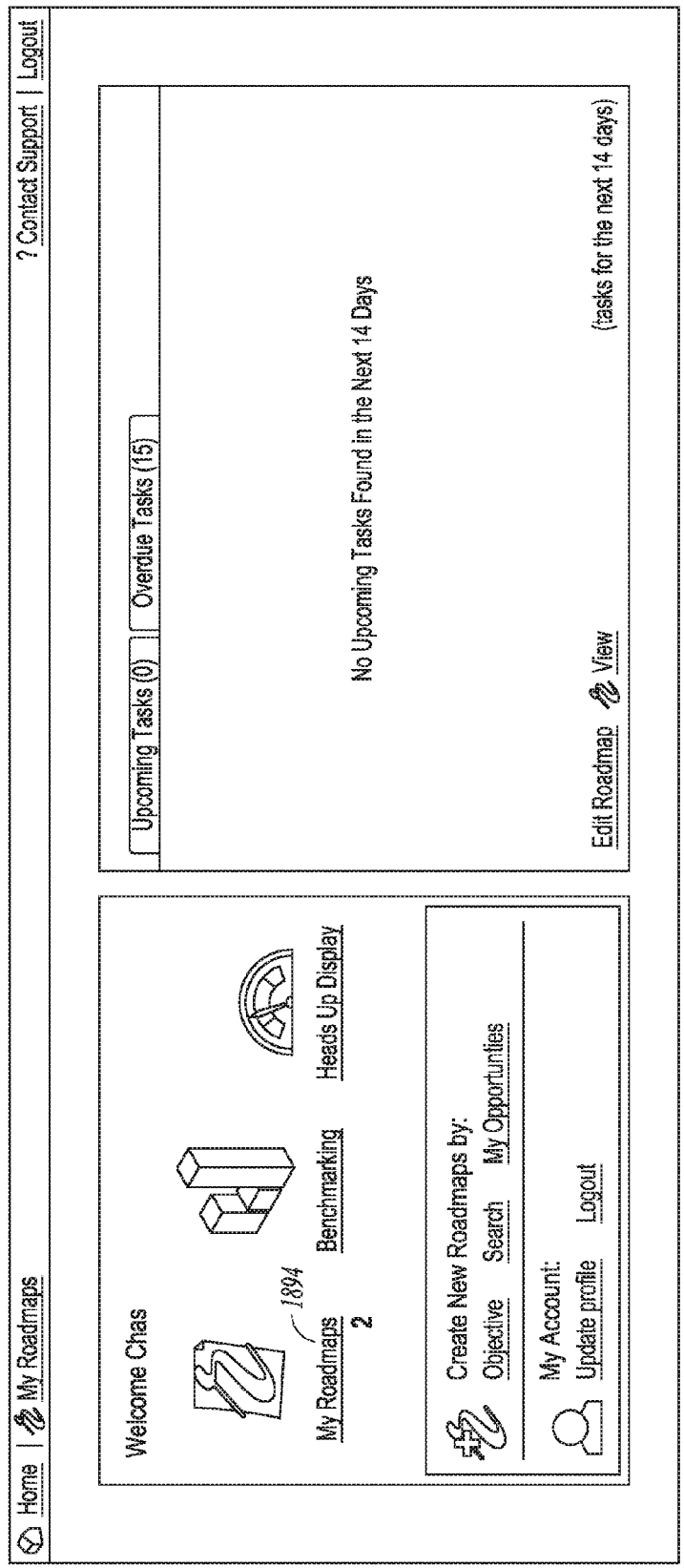

The "Reporting" tab of the Manager Dashboard also gives the user insight into Roadmap usage 1800. The report of FIG. 18 displays Roadmap usage by month 1802. The report details the number of logins, new Roadmap reports created, and Progress Updates created each month. Another usage report 1804 shown in FIG. 19 provides information by Access Key. This report displays new Roadmaps and Roadmap updates by Access Key for the date range 1806 selected at the top.

The GUI of FIG. 20 shows the "Client Details" 1810 tab. This tab shows a summary of client firms and profile information. From here, it is possible to view each advisor's Roadmaps by clicking on any of the clients 1812 listed on the screen.

Figure 21:
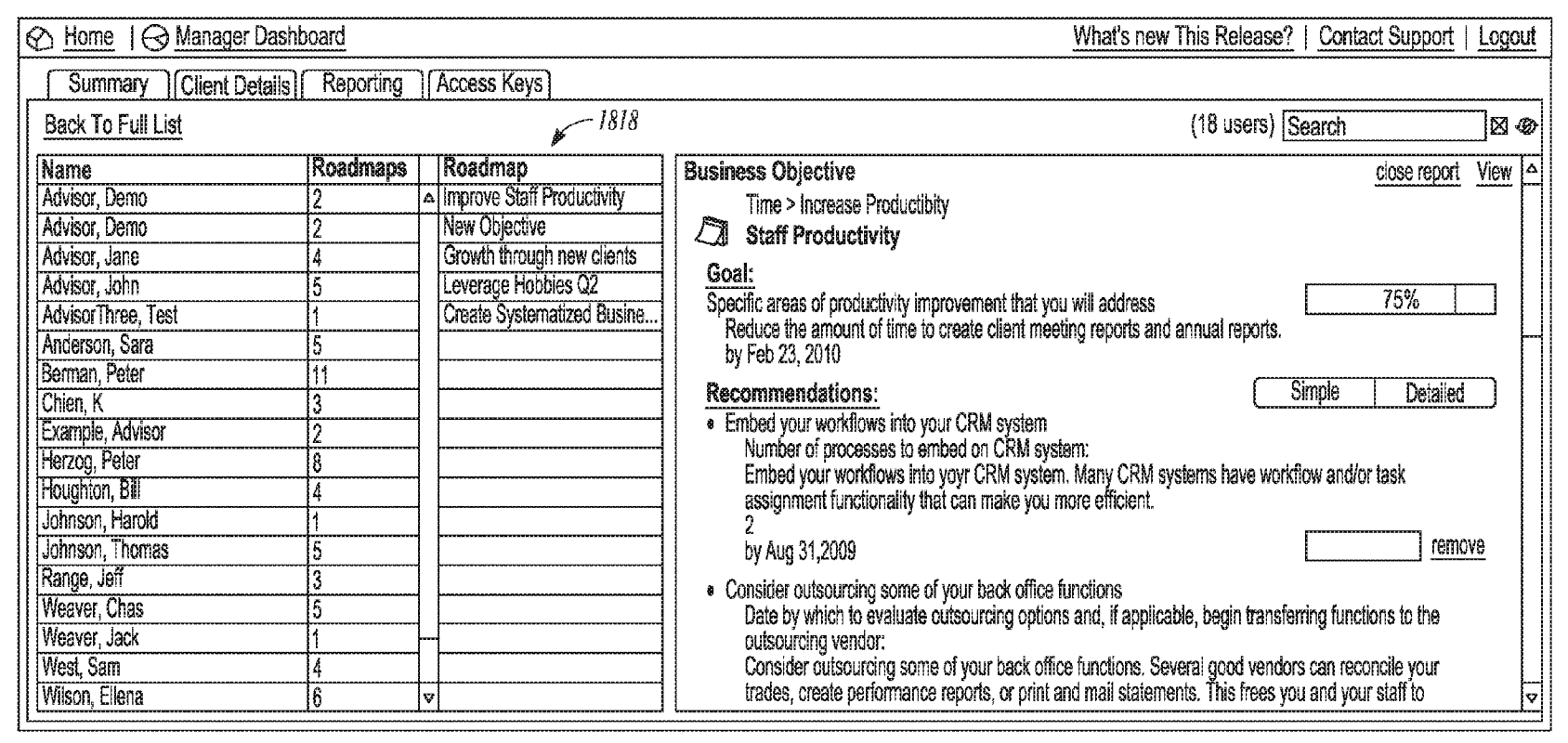

As shown in FIG. 21, by clicking on the firm "TJ & Associates," 1814 (FIG. 20) the user can view the five Roadmaps 1818 this firm has created.

Set forth below is a description of a method for using the GUI and system to create a new advisor user. The method includes, as shown in FIGS. 22 to 25:
1. From the Manager Dashboard "Summary" tab, navigate to the "Create New User" sub-tab 1820.
2. Select the appropriate Access Key 1822.
3. Create a unique user name 1824.

Please note that the user should only have one login ID per practice. The user might create Roadmaps with different members of a firm (e.g. CEO and Operations Manager), but they will all be created and saved under the same login.

4. Select the "Create" link 1826. The system will auto-generate a password for the user, which the user will not see—this password will not need to be recorded nor remembered as the user will login on the advisor's behalf from the manager dashboard.
5. Once the user has created the new firm, navigate to the "Login As User" 1828 sub-tab.
6. Select the new user 1830 based on the username the user created in the previous step (it should be at the bottom of the list, but the user can sort alphabetically by selecting the column title).
7. Click the "Login" link 1832—the system will launch a new Roadmap session for the user in a separate window (based on browser settings). We strongly recommend that the browser be set to launch a new window, so that when the user use a web conference system, the user can configure the presentation to display a clean version of the advisory firm's Roadmap session.
8. From the new browser window, the user is prompted to complete 1834 the "User Profile."
9. Click the OK button 1836, and the browser is directed to the Profile screen.
10. Go through the Profile sections 1840 and complete each section.
11. User Password—the user can create a password for the user in this section as well. Click the "Login" link 1842 on the left side of the screen and the user is directed to the section where the user can create a password for the user. Click "Change Password" to activate the password fields.
12. When registration is completed, the user is directed to the Roadmap creation screens. The user can also logout and close the browser window, and log in on behalf of the user at a later time.

FIGS. 26 to 31 illustrates a method of Creating a new Roadmap for an advisor using the GUI and system, as follows:
1. From the manager dashboard 1845, select the advisor with which the user wish to work, and click the "Login" link 1847. The user will then be logged-in on behalf of that advisory firm.
2. Prior to sharing the screen, perform the actions to ensure that the user presents only the advisory version of Roadmap, and not the manager dashboard or other applications with client data:
   a. From the web conference session share only the immediate browser window with the Roadmap version for the current advisory firm.
   b. Make sure that the manager dashboard is minimized, or close the window altogether.
3. Once the user is sharing the screen with the advisor, select the "Create New Roadmap by Objective" link 1852 from the home page 1850.
4. Guide the user through a Roadmap path based on the assessment of their needs. In the following example, we are focusing on profit by growing revenue through acquiring more clients. Choose a High-Level 1860, Mid-Level 1862, and Detailed Business Objective 1864. Click "Next" 1866 when complete.
5. Define a goal with the client 1875. The goal is tied to the mid-level objective. Specific recommendations will determine which key activities the advisor will pursue to increase the likelihood of achieving the goal. Click "Next" 1877 when the goal has been defined.
6. Determine which recommendations 1880 the advisor should implement to maximize the possibility of achieving his or her goal. At this point it is critical that the advisor agrees to carry out the specific recommendations. If the goal the advisor sets is not in alignment with the actions he or she is prepared to take, work with the advisor to look for alternatives (e.g. outsourcing, consultants, etc.) or reset the goal to a more achievable metric.
7. Each recommendation has a milestone 1884, and in some cases, a metric assigned to it. As with goals, help the advisor set realistic targets. Make sure the user set a milestone and metric (if available) for each recommendation that was selected. When complete, select "Generate Report" 1886.
8. Once the user has selected "Generate Report" the user is prompted to enter a unique name for the Roadmap report. We recommend the user select a name the user can reference easily in the future and describes the Roadmap's objective such as "Grow Client Base Q2 2008".
9. After entering a report name and selecting "Save," the Roadmap screen is redirected to the advisory firm dashboard and a new pop-up of the report is generated.
10. Read through the report with the client and determine if the user would like to send them a copy in PDF or RTF format.

Referring now to FIGS. 32 to 35, there is illustrated a method to review an existing Roadmap with an advisor, according to one example embodiment, including:
1. From the manager dashboard, select the user 1890 and click the "Login" link 1892 at the bottom of the screen—a new browser session is launched, and the user is logged-in on behalf of the advisory firm.
2. Once the user is sharing the screen with the advisor, select the "Your Roadmap Dashboard" link 1894 from the advisory firm home page.
3. From the "Roadmaps" tab 1898 the user can see the existing Roadmaps 1900 for this user, and select the one the user wish to review. The user can also choose the following actions:
   a. View the Roadmap report that was created
   b. Launch a PDF or RTF version of the report
   c. Rename the Roadmap report
   d. Add or remove recommendations from the Roadmap report
4. Select the "Goal Progress" tab 1904 to review goals and metrics, and to record updates on progress towards the goal and recommendations. From here, the user can do the following:
   a. Update goal and recommendation progress using the "Overall Goal Progress" and "Metrics & Milestones" sub-tabs 1906.
   b. Alter key attributes (e.g. date or dollar amount) of goals and metrics FIGS. 36 and 37 illustrate a GUI 1908 for showing progress history. Each time the user update the progress of an advisor's Roadmap in the "Goal Progress" tab, the information is saved as a separate entry. In the screen shots below, the user will notice the Roadmap called "Grow AUM" has two entries, one on Jun. 4, 1912 and another on Jun. 8, 1910. Notice that the information on the right—hand side of the screen 1914 is different for the entry on June 4th (first screen shot) than the entry on June 8th (second screen shot) 1916.

Note, in one example embodiment, the user can only save one entry per day. If the user updates the same Roadmap more than once in the same day, the system will override the earlier information with the most recent changes.

Figure 39:

The GUI of FIGS. 38 and 39 illustrates a business plan generator 1920 that allows an advisor to create a business plan using multiple Roadmap reports as well as other information. The business plan generator is located in the advisor Roadmap dashboard under the "Create Plan" tab 1922. This GUI and system is used, in one example embodiment, according to the method that includes:

1. Select which Roadmap reports the user would like to include in the Business Plan. The user clicks the check boxes 1924 next to the reports the user want to include and click "Next" 1926.
2. On the next screen 1928 the user can input or select other information to include in the Business Plan. Each enterprise firm that licenses Roadmap will have slightly different options, so the screen shot below is just an example of the options that are typically available.
3. Select "Create" 1930 at the bottom of the screen to generate the PDF or RTF report.

Figure 41:
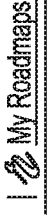
Figure 42:

FIGS. 40 to 42 illustrate a GUI for an agenda generator that allows the user to create a meeting agenda using multiple Roadmap reports. The tool is located in the Advisor Roadmap dashboard under the "Create Agenda" tab 1932. There are two agenda creation options, a quick agenda 1934 and a custom agenda 1936. In this example method, the "Quick" Agenda Generator option simply looks for tasks that are due within 7, 14, or 30 days. The "Custom" Agenda Generator option lets the user select which Roadmap reports to include for review in the agenda. In this example method:

1. After selecting the Roadmap reports to include in the agenda 1942 from the roadmap selection window 1940, the user clicks "Next" 1938 and is taken to the screen of FIG. 42 1944 where the user can choose from a few more options 1946 before generating the agenda. The user clicks "Create" 1948 to generate the meeting agenda.

Figure 43:
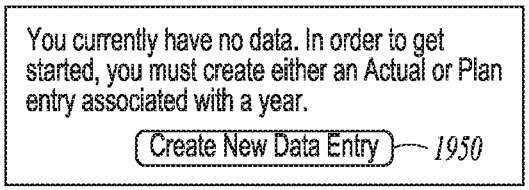
Figure 44:
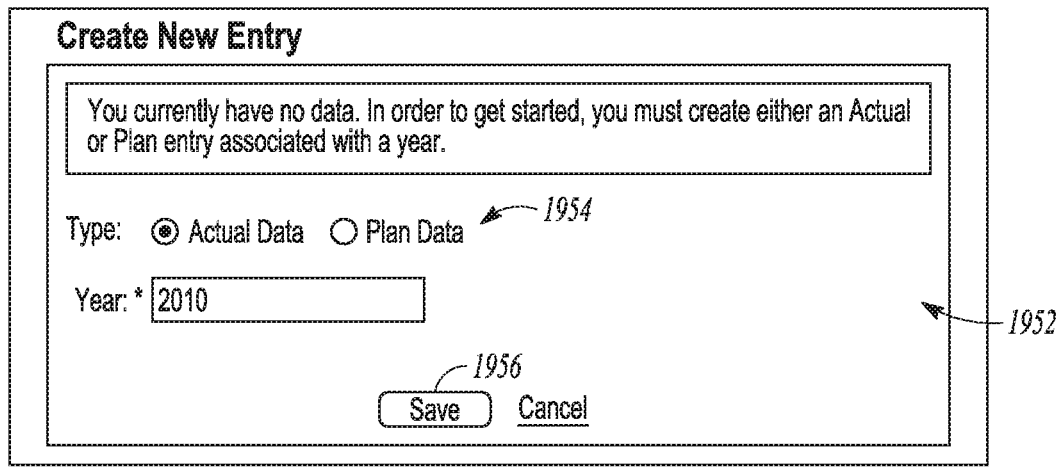

FIGS. 43 to 45 illustrate the GUI of the benchmark module that allows the user to track actual and plan data for the practice and compare the practice to benchmark groups.

The exact configuration of the benchmark module may optionally vary based on the enterprise organization that is using the tool. In some instances, all data entry may be manual and that is the scenario described herein. In other alternate embodiments, there are provided automatic data feeds from external sources. If the configuration of the benchmark module includes data feeds, then the usage of the tool may differ slightly from what is described below.

For the first time the user use the benchmarking module there is a couple of set—up steps to complete, including the following method:

1. The user clicks on Create New Data Entry 1950.
2. Next the user is asked to define the time period 1952 and type (actual or plan) of entry 1954 the user wish to make.
3. The user clicks "Save" 1956 to continue.
4. Next the user is directed to the data input form 1960 where the user will enter metric information.
5. The user enters the information in the gray input boxes. To move from one section to the next the user clicks on the next horizontal tab of the accordion file (e.g., "AUM/Production Indicators," "AUM Breakdown," etc.)
6. When the user is finished with the input, click they click "Save Changes." 1962

As shown in the GUI of FIGS. 46 to 49, in the benchmark module there are three different reporting tabs. Each tab is designed to give the user views into actual vs. plan, or actual vs. benchmark results. The three sub—tabs in this section of the benchmark module are: Reporting 1964, Charting 1966 and Custom Comparisons 1968.

Figure 46:
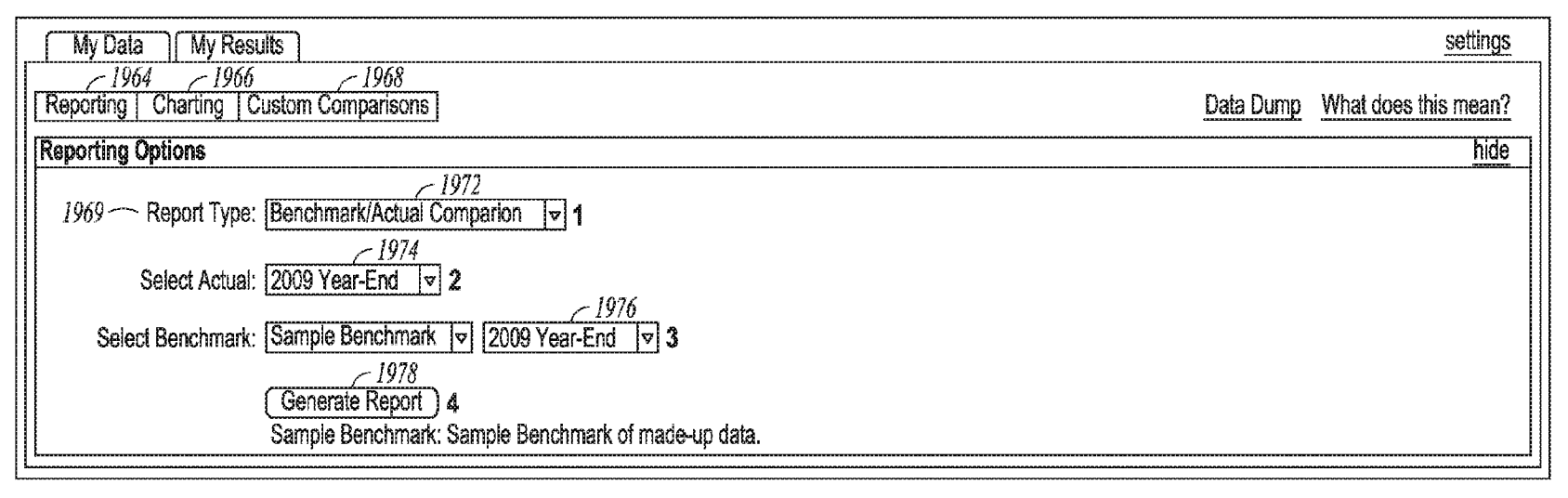

The reporting tab shown in FIG. 46 provides a canned benchmark comparison report 1969. To run the report the following method is used:

1. Select the Report Type 1972
2. Select Actual results time period 1974
3. Select the appropriate benchmark and benchmark time period 1976
4. Click "Generate Report" and a PDF comparison report is generated 1978

Figure 47:
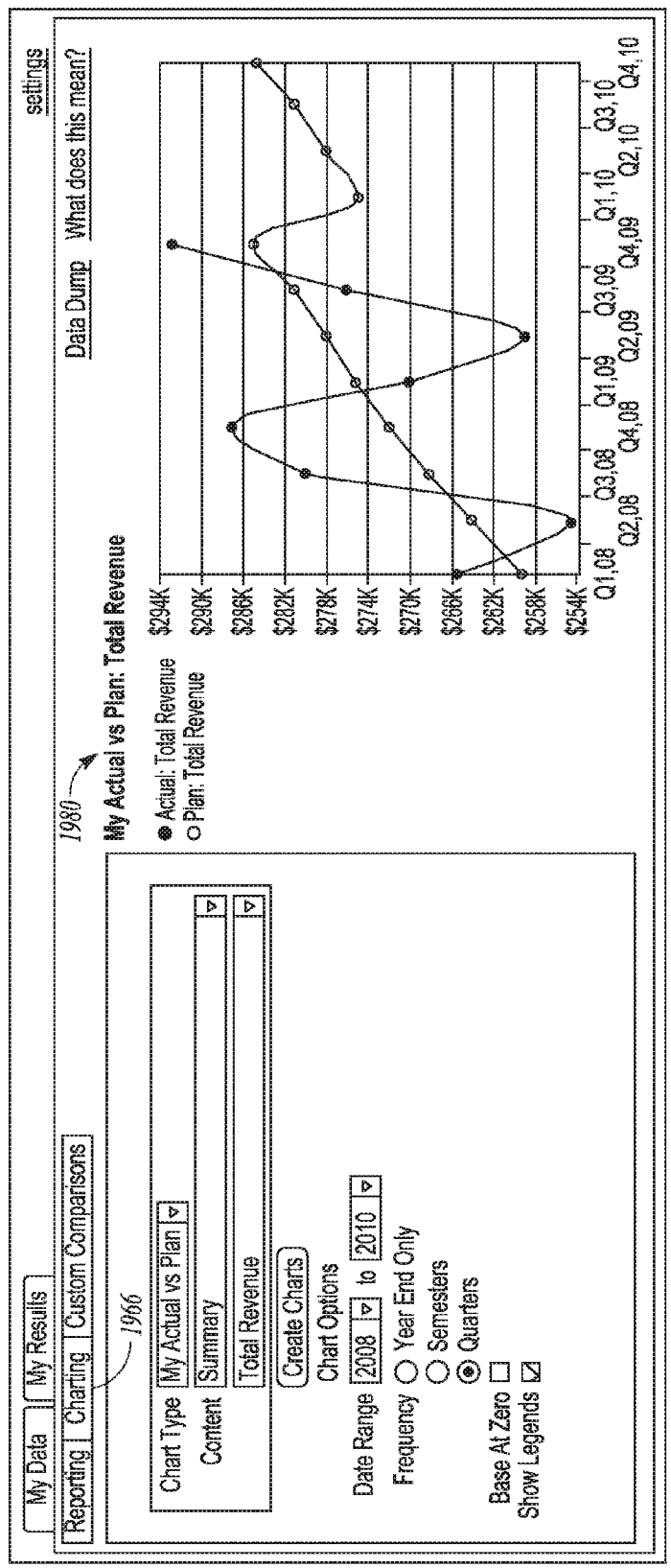
Figure 50:
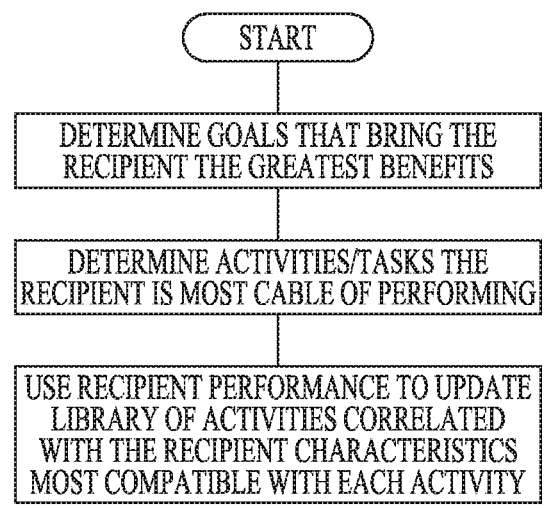
Figure 51:
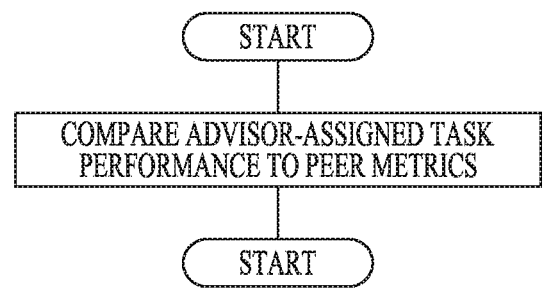
Figure 52:
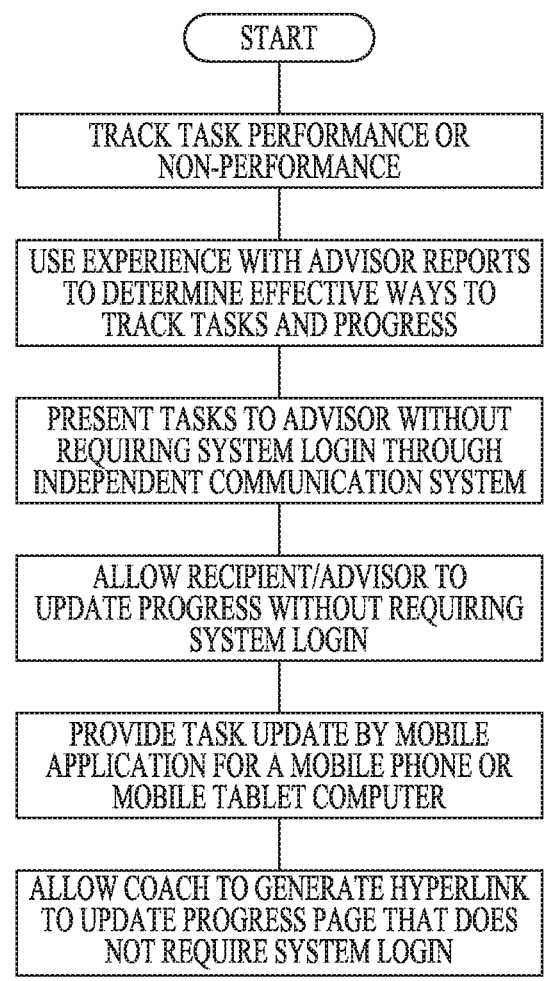
Figure 53:
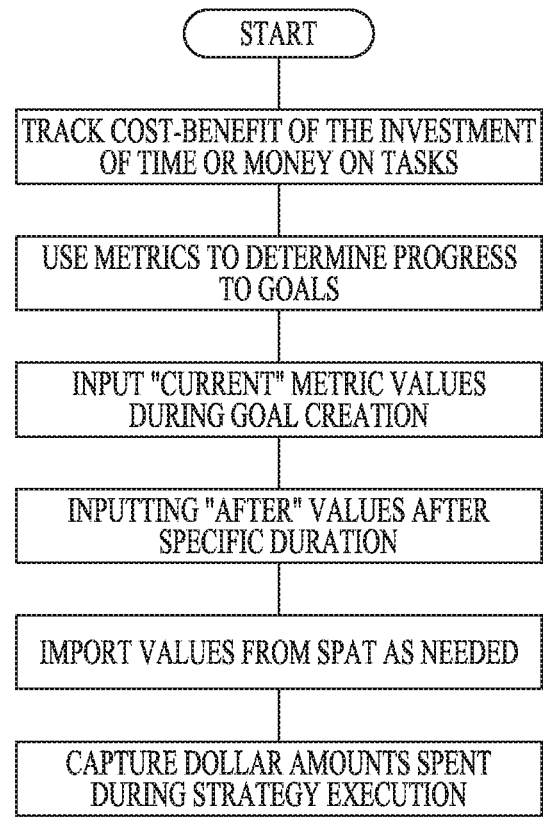
Figure 54:
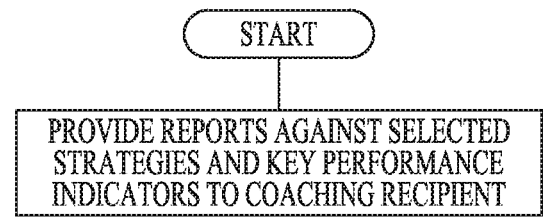

The charting tab 1966 shown in the GUI of FIG. 47 allows the user to look at actual vs. plan results 1980 in a graphical format. The user can chart any metric that is included in the list of metrics for version of Roadmap.

Figure 48:
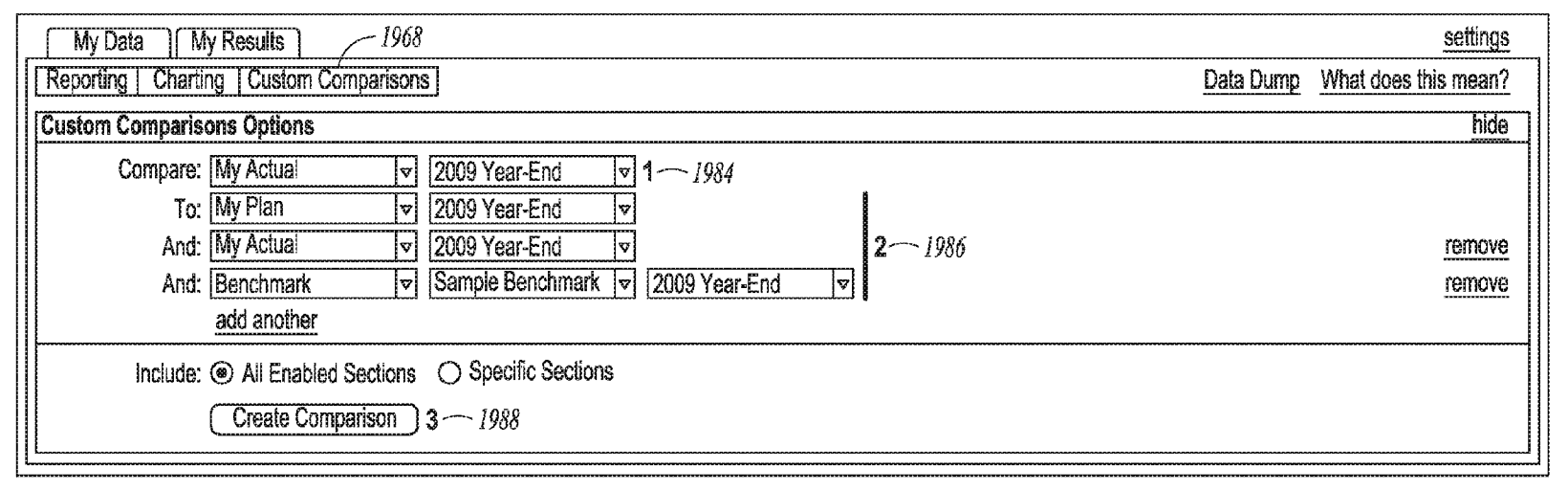

The custom comparisons tab 1968 illustrated in the GUI of FIG. 48 allows the user to create a custom report using any of the data available in the benchmark module. The user can create up to four comparisons within on report, using the following method:

1. Select the data set to compare against other data sets (this is usually actual results) 1984
2. Select up to four (4) additional data sets to compare against 1986
3. Select "Create Comparison" to generate a custom report 1988
4. Once the report is generated on screen 1990, the user can export it to PDF 1992

As illustrated in FIGS. 50 to 58, the system as described herein is used to perform various methods to support computer assisted coaching of coaching recipients. In one example embodiment, as described with respect to the GUI of FIGS. 9 to 49, the coaching recipients are financial advisors seeking to improve their advisory practices. As shown in flow chart of FIG. 50, according to one example, the assessment module is used to assess a financial advisor who is to be a coaching recipient, in order to determine the goals that will bring the advisor the greatest benefits, and determine which activities/tasks the recipient is most capable of or most likely to be successful performing. According to one embodiment, the actual performance of coaching recipients is used to update a library of activities that are correlated with the recipient characteristics most compatible with each activity in the library.

According to the example method of 51, the coaching system is used to compare advisor performance on assigned tasks to metrics for their peers, stored in the coaching system in a performance data structure for each advisor/recipient.

According to the example method of 52, the coaching system is used to track task performance or non-performance, and determine the most effective, or more effective, ways to track tasks and progress, based on experience with advisors in reporting back to the system. The method further includes, in one embodiment, putting a task or task-list in front of advisor without having to login to the coaching system, such as through independent communication systems already used by the coaching recipient for other purposes, such as their e-mail, instant message services, text message services (such as Twitter), or social media services the recipient uses for other communications. According to this method, the system further provides for ways a recipient/advisor to update progress without having to login. According to one embodiment, the task update may alternatively be provided by a mobile app for a mobile phone or a mobile tablet computer, such as an iPhone® mobile phone or iPad® tablet, sold by Apple Corporation, or similar products using the Android® operating system. In some example embodiments, the method provides for a coach to generate updated roadmap links, for a weekly email link that goes straight to update page with auto login or anonymous login.

According to the example method of 53, the method tracks the cost-benefit of the investment of time or money on tasks. The method provides for using metrics to determine progress to goals when possible. In particular, the method in one example embodiment includes inputting "current" metric values during goal creation, and inputting "after" values once a given amount of time has passed. The method further captures the dollar amounts spent during strategy execution, for example when the recipient clicks complete on the last of their tasks.

As illustrated in the method of 54, there are provided to the coaching recipient from time to time or regularly, reports against selected strategies and key performance indicators.

Figure 55:
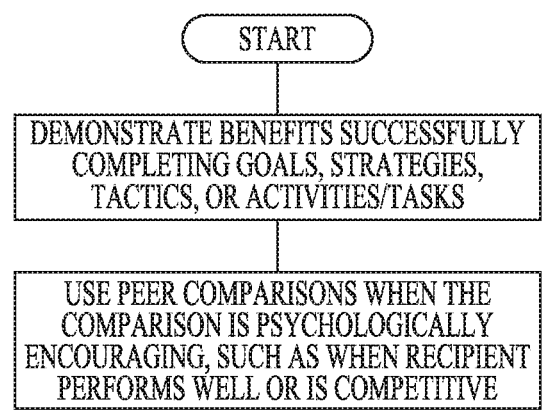
Figure 56:
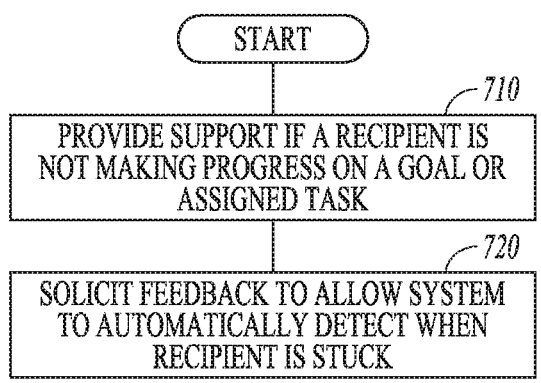
Figure 57:
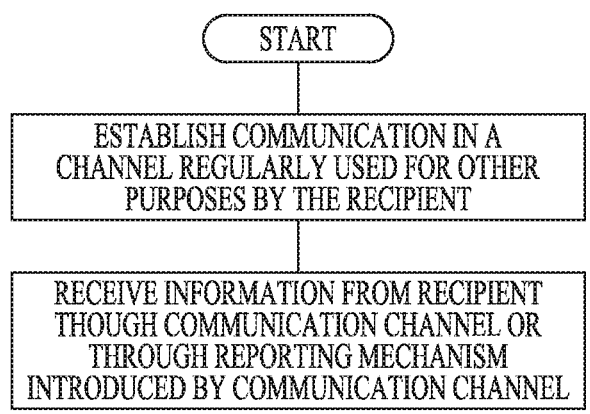
Figure 58:
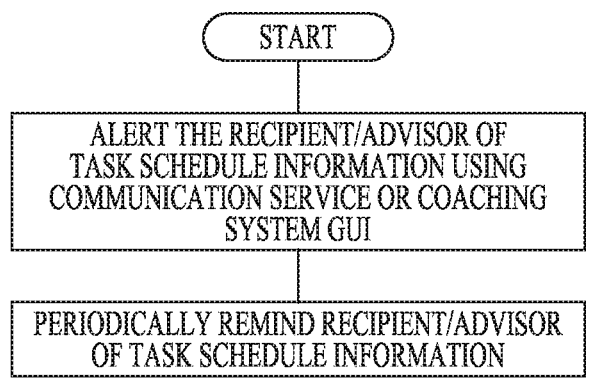
FIGS. 58 to 70 illustrate various GUI interfaces and methods, according to an example embodiment.

As illustrated in the method of FIG. 55, the method and system are used to drive behavioral change or performance by demonstrating in one or more ways the benefits of working on the goal, such as highlighting the benefits of successfully completing goals and/or strategies and/or tactics and/or activities/tasks. Such benefits may be provided by "In-app" visuals, in the case where an app is deployed for use by the coaching recipient. Alternatively, peer comparisons are used, particularly where the comparison is psychologically encouraging for the recipient, such as when the recipient is performing as well or better than peers, or is highly competitive.

As illustrated in the method of 56, the method and system are used to drive behavioral change or performance by providing support if an advisor/coaching recipient is "stuck", i.e., not making progress on a goal or sub-goal initiative, most particularly assigned tasks. According to one example embodiment, the method includes soliciting feedback from the recipient/advisor that allows for the system to automatically detect or determine, as quickly as possible, when the recipient is stuck.

As illustrated in the method of 57, the method and system are used to communicate with the recipient/advisor using the communication service or other tools (for example as described above) already used by the recipient for other purposes, in order that communication can be established in a channel that the recipient already regularly interacts with. Interaction on this communication service or tool includes receiving information and updates from the recipient through the service or tool, or through a reporting mechanism integrated or introduced by the service or tool, such as a hyperlink to an automated login service.

As illustrated in the method of 58, the method and system are used to communicate with the recipient/advisor using the communication service or other tools, or in the alternative directly through a coaching system GUI, for the purpose of alerting the recipient/advisor that task execution is required or scheduled at a particular time, or to be performed in a particular time frame. Alerts for example may be sent in real time, hourly, daily or weekly, to name a few but not an exhaustive list of possibilities.

FIGS. 59 to 70 illustrate an example embodiment of systems and methods for mobile computer guided coaching as a game on a mobile device. The systems and methods may be implemented using a variety of techniques. In some example embodiments. A mobile device (e.g., a smartphone, tablet, etc.) may be communicatively coupled via a network (e.g., the internet, etc.) to a cloud-based service (e.g., an internet connected collection of computing devices, etc.). The cloud-based service may include a variety of computing functions (e.g., database, webserver, application server, etc.) for delivering various components of the mobile computer guided coaching system. The cloud-based service may include a variety of components such as, for example, one or more processors, one or more memory devices, and one or more databases.

The mobile device may include various component such as, for example, a processor, memory, a display device (e.g., a graphics processor, display screen, etc.), one or more environmental sensors (e.g., a touch screen, keyboard, trackpad, accelerometer, GPS receiver, gyroscope, etc.). In some embodiments, the mobile device may include an installed application that may communicate with the cloud-based service to deliver various components of the mobile computer guided coaching system. In some embodiments, the mobile device may include a web browser for accessing a webpage used to communicate with the cloud-based service.

In the example embodiment, game mechanics are employed to provide the user with additional motivation and incentive to complete coaching activities. The user may be presented with a goal. For example, in order to facilitate business growth the user may be presented with a "Growth" goal. Each goal may have one or more corresponding activity tracks which may be presented to the user. The activity tracks may be categorized according to a designated workflow. For example, in the Growth goal example the user may be presented with an activity track of "Manage Time" in a "Discovery" category and activity tracks "Differentiation," "Segment Clients," "Ideal Clients," "Business Process," and "Social Media Research" in an "Initial Exercises" category. Each activity track may contain one or more tasks for the user to complete. For example, the "Ideal Client" activity track may contain a "Define Tour Ideal Client" task, a "Review Prospect List" task, and a "Describe Ideal Client" task.

The activity tracks and corresponding tasks may be presented to the user for completion in a specific order. For example, the user may be presented with tasks corresponding to the "Manage Time" activity track in the "Discovery" category before tasks corresponding to the "Differentiation" activity track in the "Initial Exercises" category.

Upon completing a task the user is awarded points. For example, upon completing the "Define Your Ideal Client" task the user may be awarded 30 points. In an example, the user may be presented with add-on tasks that may serve to complete the task. For example, to complete the "Define Your Ideal Client" task the user may be able to mark the task complete or may be able to email a document to a system administrator to complete the task. In an example, the user may email a document defining the user's ideal client to the system administrator and additional points may be awarded to the user. In an example, the user may be able to schedule a time to complete the task by launching a calendar application on the mobile device. When the points are added to the user's account a new points total is calculated.

The user may be presented with a daily check-in task that may be completed on a daily basis. In an example, the daily check-in task may correspond to the current goal the user is working to complete. For example, when the user is working to complete the "Growth" goal the user may be presented with a daily check-in task of "Have you thought about your business today?" The user may be awarded points for completing the daily check-in task. In an example, the user may be awarded additional points for a pattern of completing daily check-in tasks. For example, the user may be awarded bonus points for completing the daily check-in tasks for 3 days in a row or for completing the daily check-in tasks at least twice a week for four weeks. The points for completing the daily check-in task and any bonus points are added to the user's points total.

The user may track progress by viewing a graph showing points earned over various time periods. For example, the user may be presented with a graph that may display points earned over Days, Weeks, or Months. The user may also track progress against peers by viewing a leader board. The user leader board presents a display of the user's point total along with the point totals of other users of the system. In an example, the leader board contains known peers of the user (e.g., co-workers, friends, etc.). In an example, the leader board may be filtered in a way that promotes a psychological response from the user. For example, the leader board may be filtered so that the user is higher on the list in response to the user actively using the system and activate a sense of accomplishment in the user. For example, the leader board may be filtered so that the user is lower in the list in response to the user not actively using the system to activate a sense of urgency in the user.

In some example embodiments, a selectable user interface element corresponding with a first activity (e.g., FIG. 60 element 6015, etc.) may be generated for rendering using a display device of a mobile device. An existing points total (e.g., a sum of activity points values for previously completed activities, etc.) may be calculated for a user of the mobile device. A number of times the selectable user interface element has been selected over a period of time may be identified from a first activity history of the user collected from at least one environmental sensor of the mobile device. For example, the user may have selected a selectable user interface element corresponding with a daily check-in activity 5 times over a one week period by selecting the selectable user interface element using a touch screen of a smartphone. In an example, the period of time may be one week and the first activity points value may be increased when the number of times the selectable user interface element is selected is three.

A first activity points value may be determined for the first activity using the first activity and the number of time the selectable user interface element has been selected over the period of time. A new points total may be calculated for the user, upon receiving an indication of a subsequent selection of the selectable user interface element from the at least one environmental sensor, by summing the existing points value and the first activity points value. An indication of the first activity points value (e.g., FIG. 66 element 6605, etc.) may be generated for rendering using the display device of the mobile device. In some examples, a message corresponding to the indication of the first activity points may be provided for rendering using the display device of the mobile device. An update to the selectable user interface element including a user interface element indicating that the activity has been completed (e.g., FIG. 62 element 6215, etc.) may be transmitted for rendering using the display device of the mobile device. A second selectable user interface element (e.g., FIG. 62 element 6235, etc.) may be transmitted for rendering using the display device of the mobile device upon expiration of a window of time. The second selectable user interface element may correspond with a second activity. In an example, the second activity may be subsequent to the first activity in an activity workflow.

In some example embodiments, a points total may be identified for at least one other user. The new points total for the user may be compared to the points total for the at least one other user. A sorted list may be generated including the new points total for the user and the points total for the at least one other user (e.g., FIG. 63 element 6310, etc.). A graphical representation of the sorted list including an identification of the user and an identification of the at least one other user may be generated for rendering using the display device of the mobile device (e.g., FIG. 63 element 6305, etc.). In an example, the points total for the at least one other user may be identified based on the points total being lower than the new points total of the user and the user is higher on the sorted list. In an example, the points total for the at least one other user may be identified based on the points total being higher than the new points total of the user and the user is lower on the sorted list.

Figure 59:
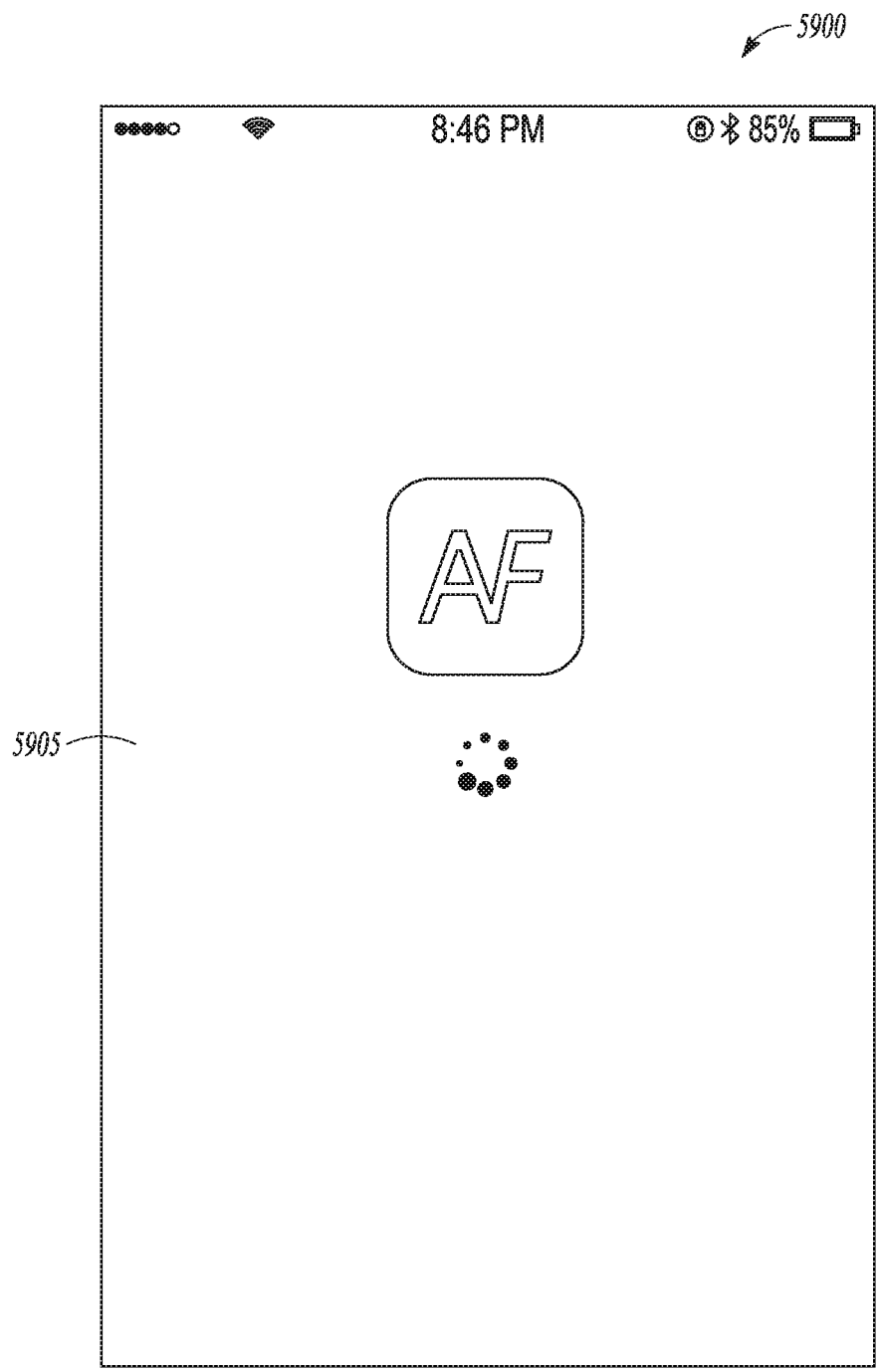

FIG. 59 illustrates a splash screen 5900 of a mobile application for implementing systems and methods for computer guided coaching as a game on a mobile device. Upon loading the application, a splash screen 5905 may load while the system initiates. After initialization the user may be presented with a home screen.

Figure 60:
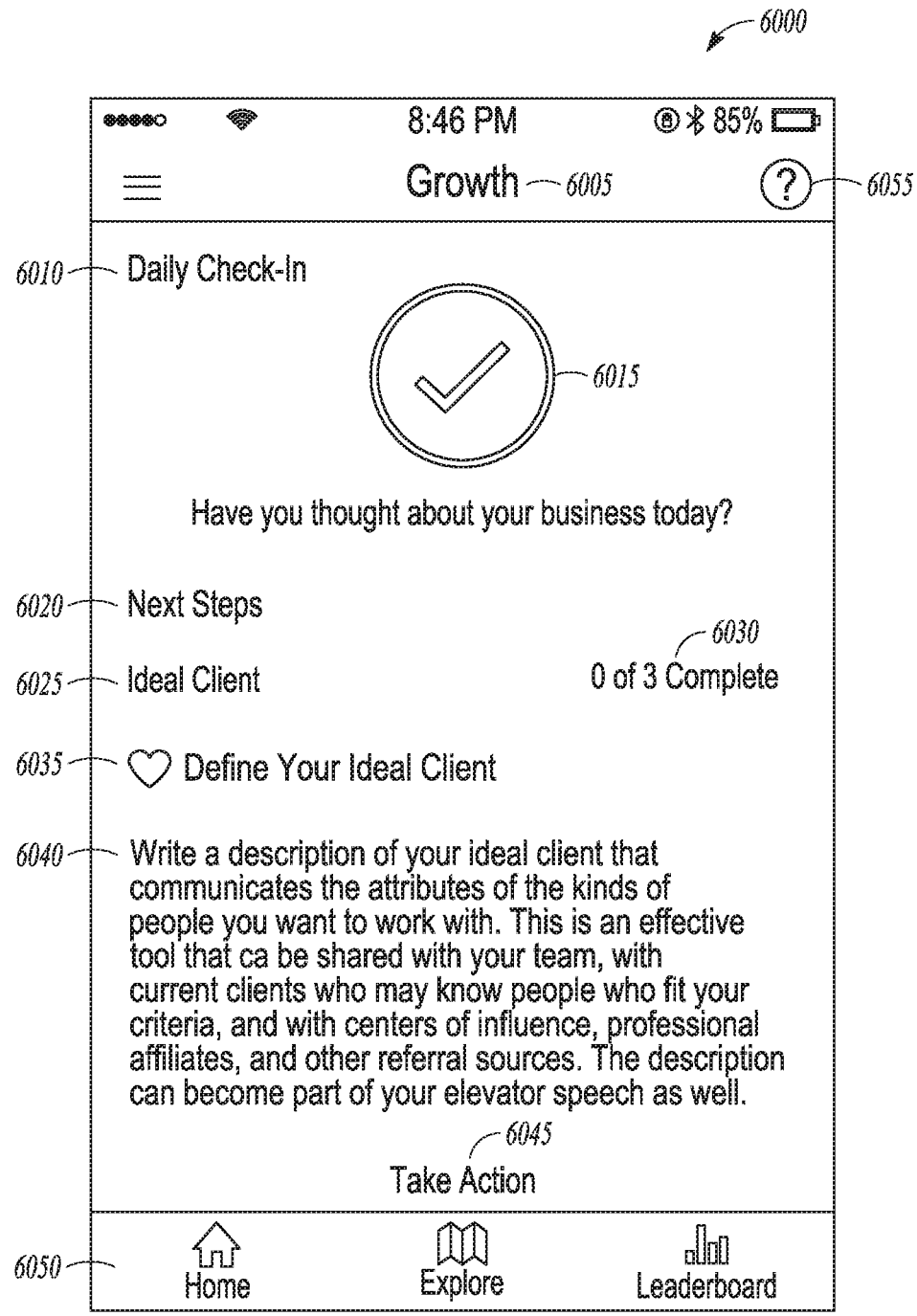

FIG. 60 illustrates a home screen 6000 of a mobile application for implementing systems and methods for computer guided coaching as a game on a mobile device. The home screen 6000 may display the user's current activity track 6005. For example, if the user is currently working on completing goals in the growth activity track "Growth" may be displayed at the top of the home screen 6000. The GUI may include an indication of a daily activity 6010 for the user to complete. In an example, the user may be provided with a "Daily Check-In" activity. In an example, the user may be asked "Have you thought about your business today?" The user may be able to respond to the question by selecting a touch sensitive GUI element 6015. In an example, an icon may be displayed that upon selection changes appearance to indicate the selection was recorded. In an example, a faint check mark surrounded by a circle may be displayed on the screen. Upon selection, in response to completing the daily activity 6010, the check mark and circle may change from faint to bold. In an example, the user is given points for providing a response to the daily activity. For example, the user may be awarded a point for the response. In another example, the user may be given a number of points for providing a response for a consecutive number of days.

The user may be provided with an indication that additional activities are necessary 6020 to complete the goal. In an example, the user may be provided with "Next Steps" indicating tasks to be completed to complete the activity track. The next steps may include an indication of the user's current activity track 6025. For example, the user may be presented with the activity track "Ideal Client" of the "Growth" goal. Each activity track may include multiple tasks. The GUI may include an indication of the number of tasks completed for the activity track. For example, the display may indicate that 0 of 3 tasks are complete meaning that the user has not completed any of the 3 tasks comprising the activity track.

The GUI may display the next task to be completed 6035. For example, the next activity in the "Ideal Client" activity track may be "Define Your Ideal Client." The user may be provided with a description of the task 6040 indicating the task to be performed. A selectable GUI element 6045 may be provided to allow the user to launch the task. For example, a Take Action link may be provided that when clicked launches an interface allowing the user to complete the "Define Your Ideal Client" activity task.

The GUI may also include a navigation bar 6050 that allows the user to navigate through the mobile application. In an example, the navigation bar 6050 may include several selectable GUI elements such as a home element that when selected causes the home screen 6000 to be displayed, explore element that when selected causes an explore screen to be displayed, and a leaderboard element that when selected causes a leaderboard screen to be displayed. The GUI may also include a help icon 6055. In an example, the help icon may be a selectable GUI element that when selected displays information regarding elements of the currently displayed screen. It should be understood that elements such as the navigation bar 6050 and help icon 6055 may be displayed throughout the mobile application.

Figure 61:
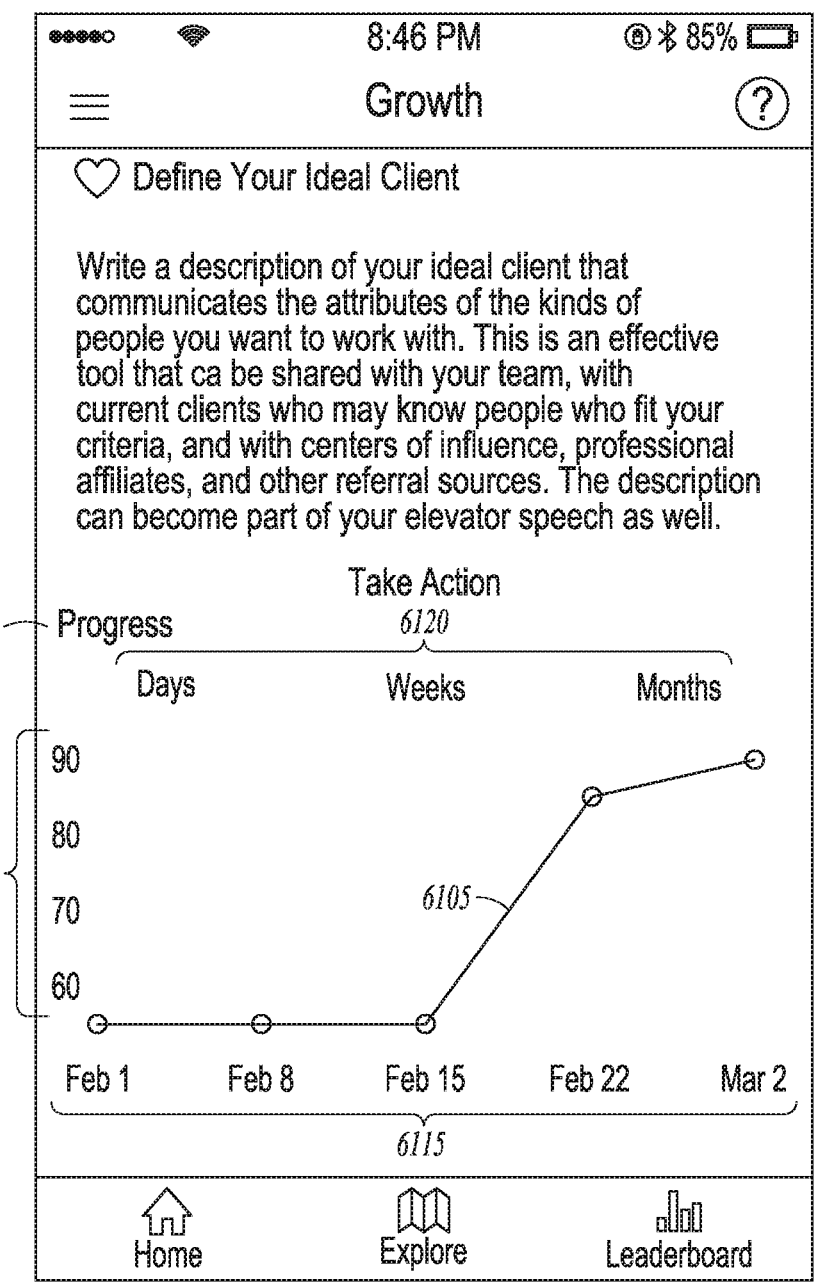

FIG. 61 illustrates a progress chart 6100 that may be included in the home screen 6000. The progress chart displays a line graph 6105 of the points earned by the user 6110 over a specific period of time 6120. In an example, the chart may include selectable GUI elements that allow the user to change the specified time period of the chart. For example, the GUI may include a "Days" element that when selected changes the timeline of the chart to days, a "Weeks" element that when selected changes the timeline of the chart to weeks, and a "Months" element that when selected changes the timeline of the chart to months.

Figure 62:
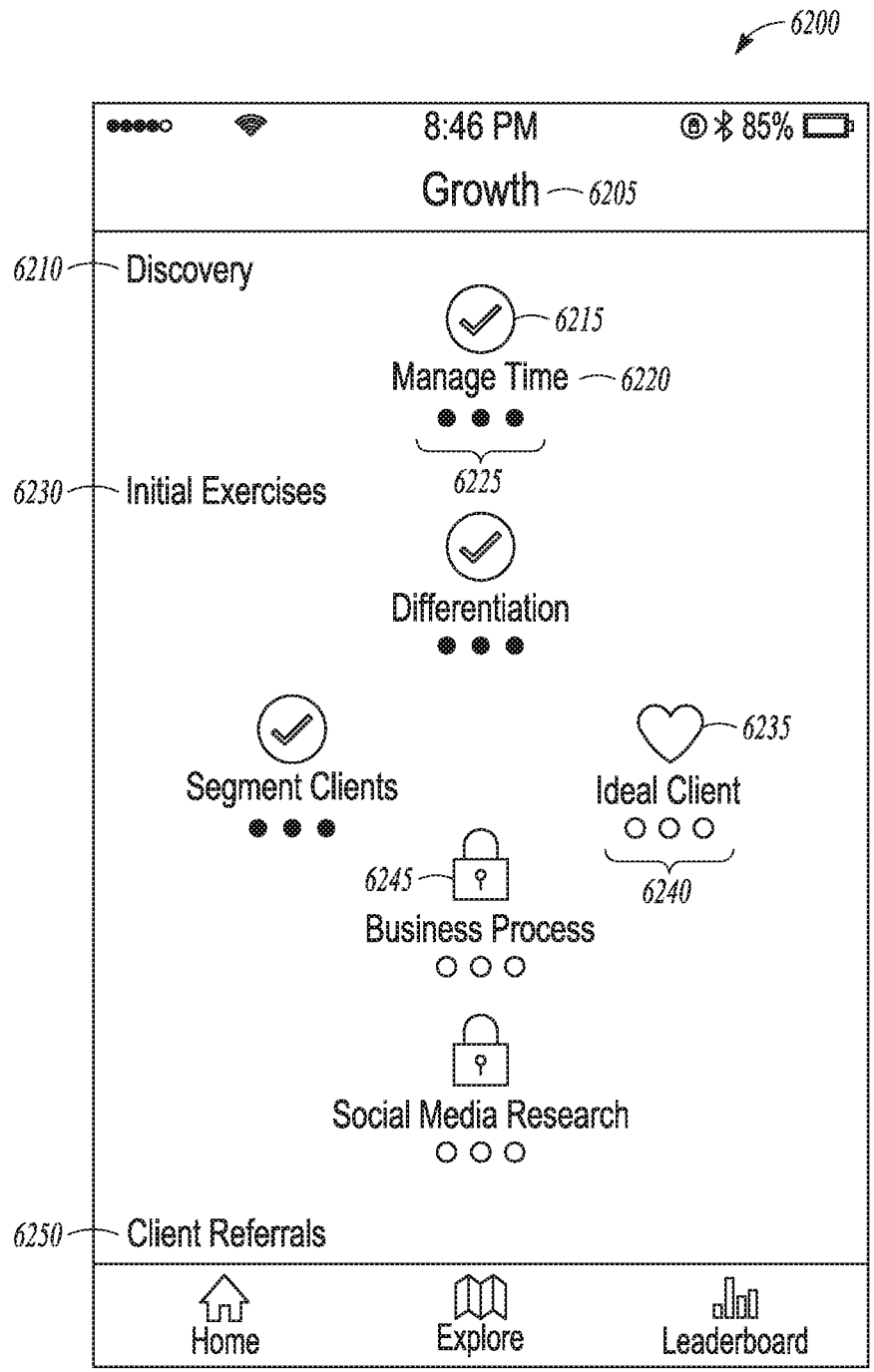

FIG. 62 illustrates an explore screen 6200 of a mobile application for implementing systems and methods for computer guided coaching as a game on a mobile device. The explore screen 6200 may include an indication of the current goal 6205 the user is working towards completing. The explore screen 6200 may also include the categories included in the goal 6210, 6230, and 6250. Each of the categories 6210, 6230, and 6250 may include one or more activity tracks 6220. For example, the "Discovery" category may include the activity task "Manage Time." The categories 6210, 6230, and 6250 may be presented in an order corresponding to a designated workflow for the goal 6205.

Activity tracks that have been completed may have a graphical GUI element indicating the activity task is complete 6215. For example, the GUI element may be a check mark. The activity track that the user is currently working to complete may have a GUI element indicating that the activity track is currently active 6235. For example, the GUI element may be a heart. Activity tracks that are not available to the user until a prerequisite activity track is complete may include a GUI element indicating the activity track is not available to the user 6245.

Each activity track may contain one or more tasks. The number of tasks in the activity track may be indicated 6225 and 6240. Tasks that are complete may be indicated by a GUI element indicating completion 6225. For example, completed tasks may be indicated by a GUI element of a solid circle. Tasks that have not been completed may be indicated by a GUI element indicating non-completion 6240. For example, tasks that have not been completed may be represented by a GUI element of an outlined circle.

Figure 63:
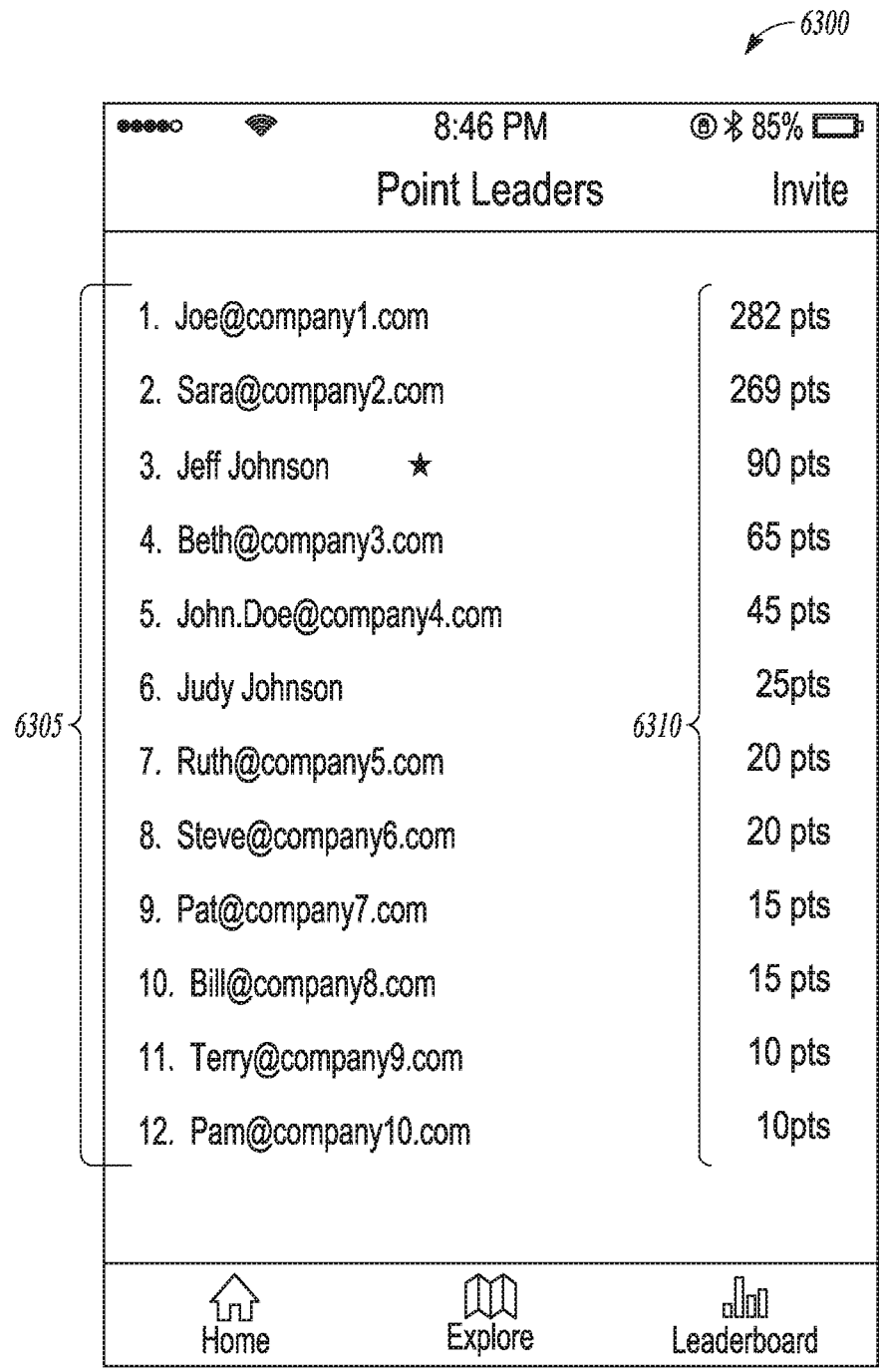

FIG. 63 illustrates a leader board screen 6300 of a mobile application for implementing systems and methods for computer guided coaching as a game on a mobile device. The leader board displays a list of users 6305 and their corresponding point totals 6310. In an example, the leader board displays the user and the user's point total and the identity of other users of the system known to the user and their corresponding point totals. In an example, the leader board may be filtered in a way that promotes a psychological response from the user. For example, the leader board may be filtered so that the user is higher on the list in response to the user actively using the system and activate a sense of accomplishment in the user. For example, the leader board may be filtered so that the user is lower in the list in response to the user not actively using the system to activate a sense of urgency in the user.

Figure 64:
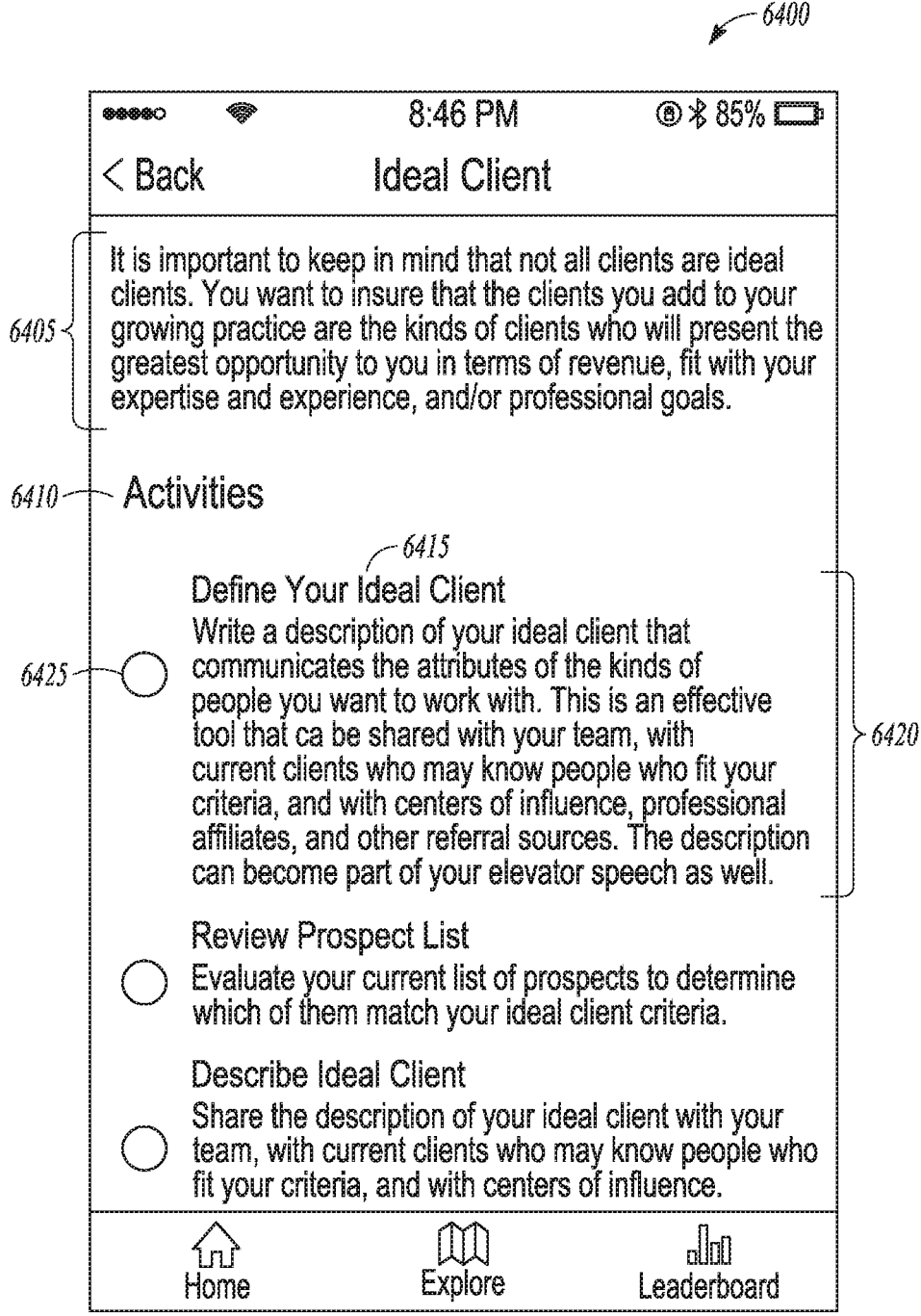

FIG. 64 illustrates a task screen 6400 of an activity task of a mobile application for implementing systems and methods for computer guided coaching as a game on a mobile device. The task screen 6400 may display a description of the activity track 6405. The individual tasks may be listed under an activity heading 6410. An indication of the task 6415 and a corresponding description 6420 may be provided to the user. A selectable GUI element 6435 may be provided that when selected displays a pop-up illustrated in FIG. 65 including options corresponding with the task for the user.

Figure 65:
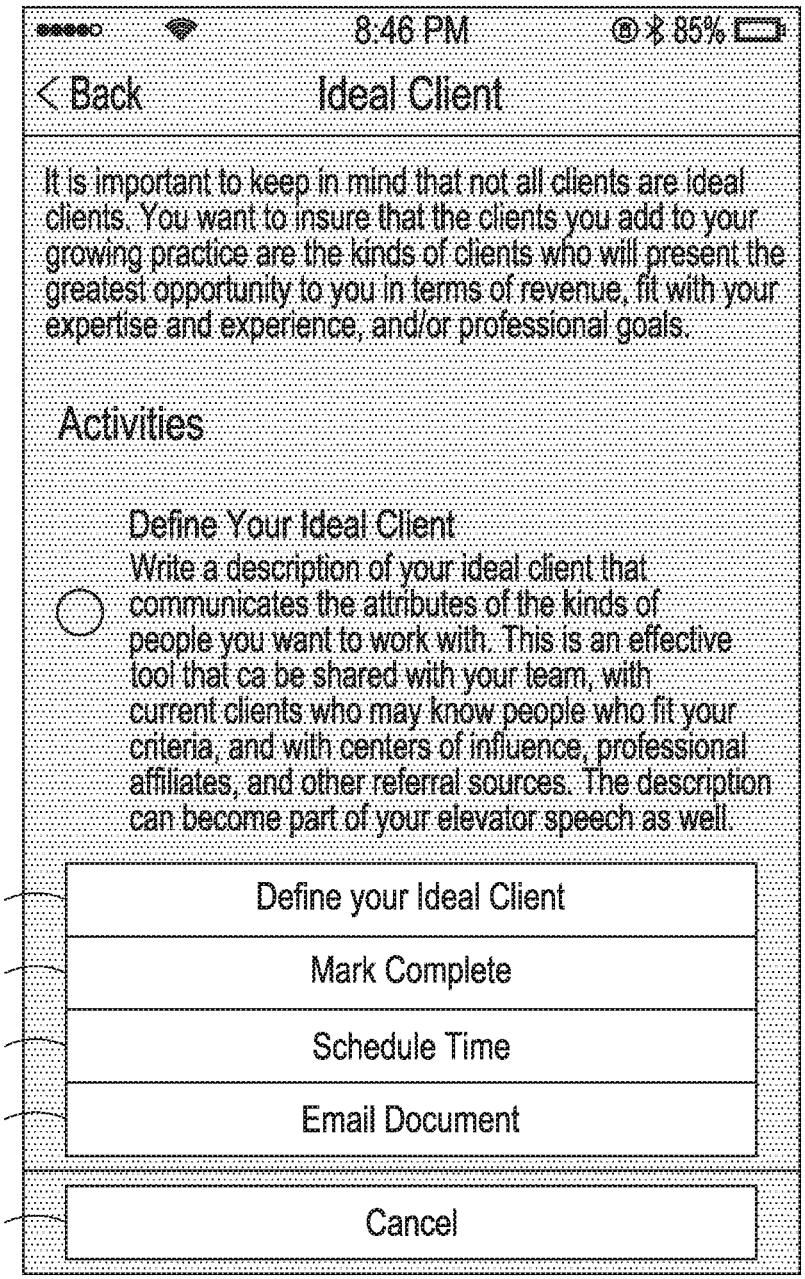

FIG. 65 illustrates a task pop-up screen 6500 of a mobile application for implementing systems and methods for computer guided coaching as a game on a mobile device. The task pop-up screen 6500 may be presented as an overlay of the task screen 6400. The task pop-up screen 6500 may include an indication of the task 6505 and one or more selectable GUI elements 6510, 6515, 6520, and 6525. A selectable GUI element for marking the task complete 6510 that when selected marks the task complete, awards points to the user's account, launches task complete pop-up screen 6600, and changes the display of the selectable GUI element 6435 of the task screen 6400. For example, marking the "Define Your Ideal Client" task complete awards the user 30 points, displays the task complete pop-up screen 6600, and changes the selectable GUI element 6435 of task screen 6400 to a GUI element of a check mark.

A selectable GUI element for scheduling a time to complete the task 6515 may be provided that when selected launches a calendar application on the mobile device allowing the user to create an entry designating a time and date to complete the task.

A selectable GUI element for emailing a document related to the task to a system administrator 6520 may be provided that when selected launches an email application on the mobile device allowing the user to send a document corresponding to the task to the system administrator. For example, the user may send a document defining the user's ideal client to the system administrator through an email client installed on the mobile device. Upon review by the system administrator points will be awarded to the user's account. In an example, sending the message automatically awards points to the user's account. In an example, the points awarded for sending the email have a higher value than the points awarded for selecting the selectable GUI element for marking the task complete 6510.

A selectable GUI element for canceling the task pop-up screen 6525 may be provided that when selected closes the task pop-up screen 6500. Upon selection the task pop-up window 6500 is closed and no changes to the task are made, no points are awarded, and the user is returned to the task screen 6400.

Figure 66:
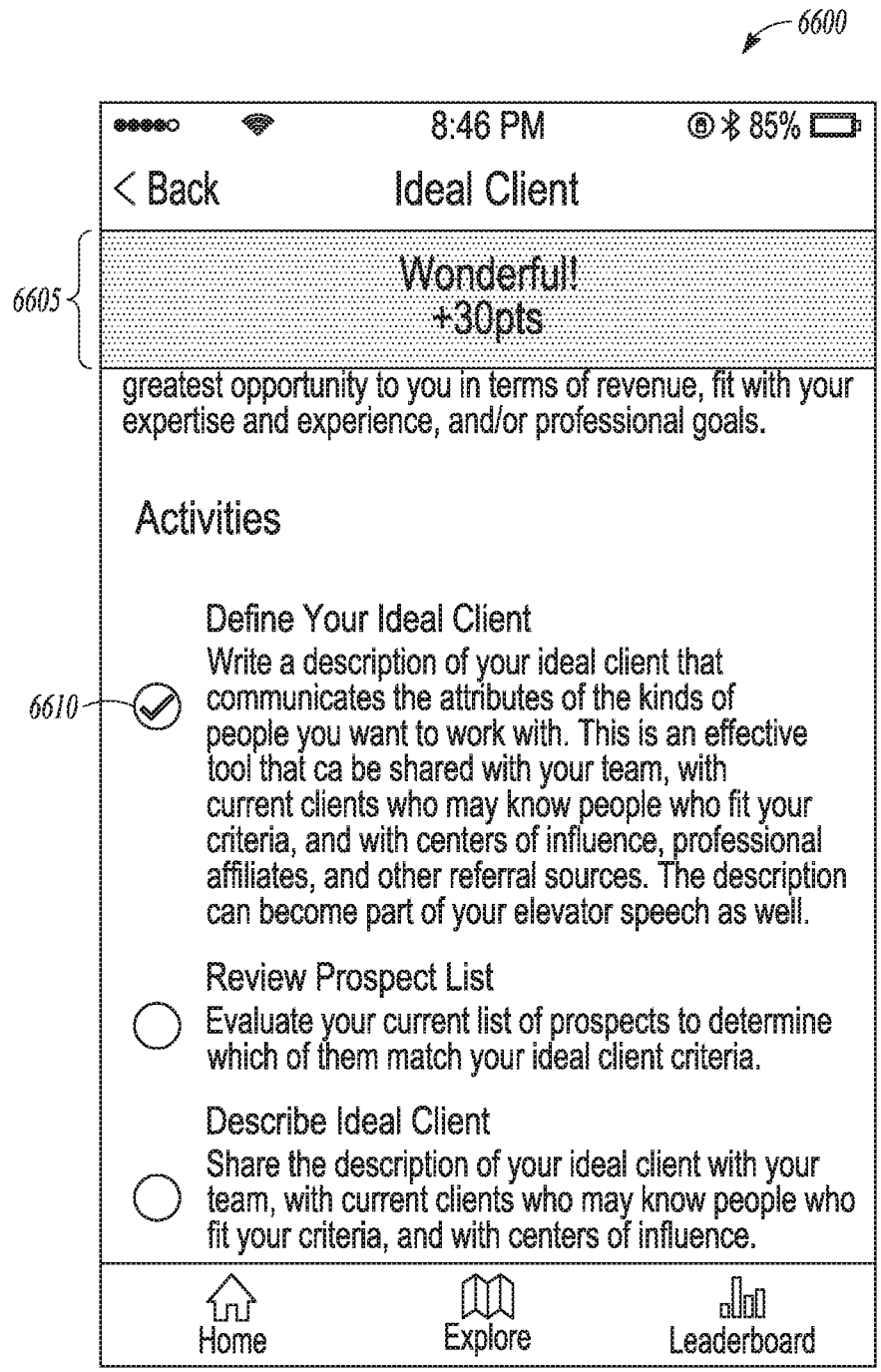

FIG. 66 illustrates a task complete pop-up screen 6600 of a mobile application for implementing systems and methods for computer guided coaching as a game on a mobile device. The task complete pop-up screen 6600 may be presented as an overlay of the task screen 6400. The task complete pop-up screen 6600 may be displayed upon completion of a task. The task complete pop-up screen may include complementary text and an indication of the number of points awarded 6605. In an example, the task complete pop-up screen 6600 may display for a designated period of time and upon expiration of the period of time the user is returned to the task screen 6400. In an example, the task complete pop-up window may be displayed until the user interacts with the mobile device. For example, the task complete pop-up screen 6600 may close and return the user to the task screen 6400 upon touching the display of the mobile device.

Figure 67:
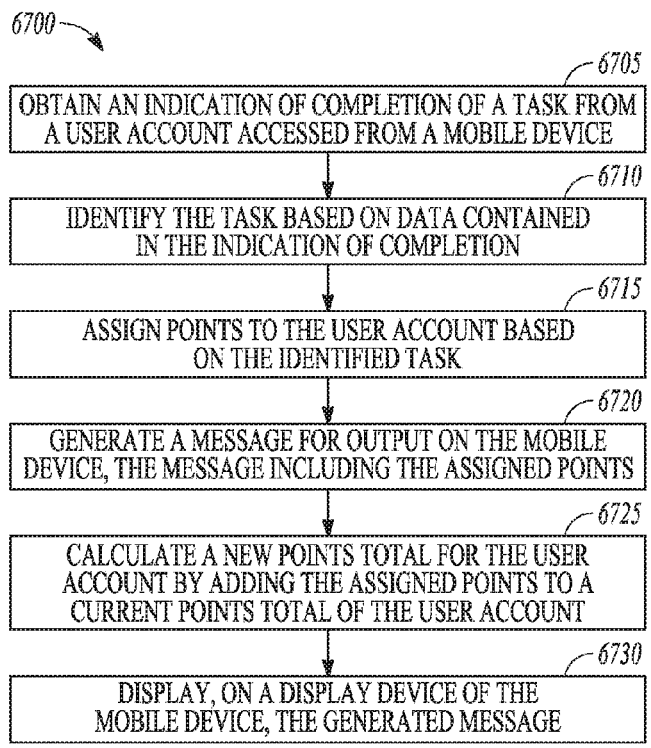

FIG. 67 illustrates a method 6700 for assigning points to a user of a mobile application for implementing systems and methods for computer guided coaching as a game on a mobile device. A set 6705 an indication of a completion of a task from user account accessed from a mobile device is obtained. For example, the user may have completed the "Define Your Ideal Client" task. At operation 6710, the task is identified based on data contained in the indication of completion obtained at operation 6705. For example, the system may be notified that a task was completed and it was the "Define Your Ideal Client" task. At operation 6715, points are assigned to the user account based on task identified in operation 6710. For example, the user may be assigned 30 points for completing the "Define Your Ideal Client" task. At operation 6720, a new points total is calculated for the user account by adding the newly assigned points to the user's existing point total. For example, if the user has already earned 100 points and is assigned 30 points for completing the "Define Your Ideal Client" task the new total is calculated as 110. At operation 6725, a message is generated for the output on the mobile device including the points assigned at operation 6715. For example, the message may include text such as "Wonderful!" and "+30 pts." At operation 6730, the message generated at operation 6725 is displayed on a display device of the mobile device.

Figure 68:
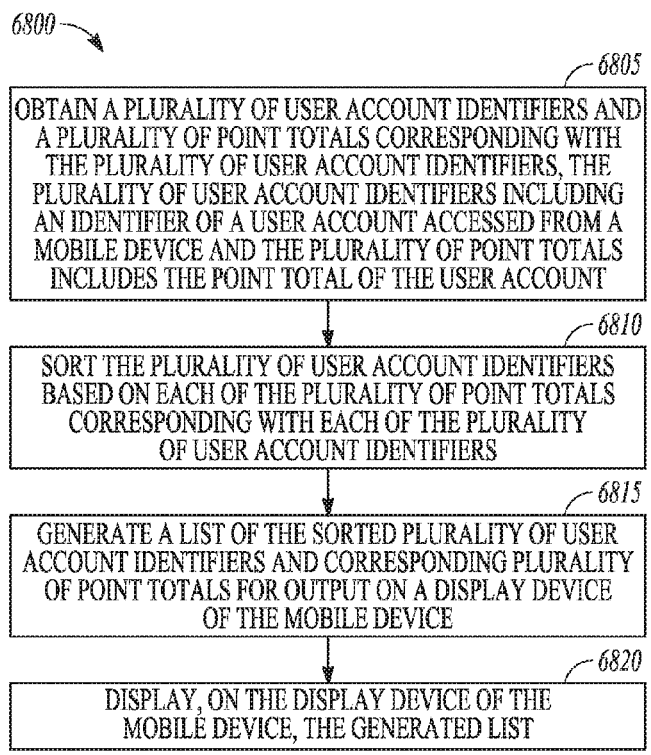

FIG. 68 illustrates a method 6800 for creating a leader board for display to a user of a mobile application for implementing systems and methods for computer guided coaching as a game on a mobile device. At operation 6805 a plurality of user account identifiers and a plurality of point totals corresponding with plurality of user account identifiers is obtained. The plurality of user account identifiers includes a user account identifier of a user account accessed from a mobile device and the plurality of point totals includes a point total corresponding with the user account identifier of the user account. For example, a collection of usernames and corresponding point totals may be obtained including the username and point total of a user accessing the system on a smartphone. At operation 6810, the plurality of user account identifiers is sorted based on each of the plurality of point totals corresponding with each of the plurality of user account identifiers. For example, the username of the user accessing the system from a mobile device may be lower in the sort order than another user because the user has a lower point total. At operation 6815, a list of the sorted plurality of user account identifiers and corresponding plurality of point totals is generated for output on a display device of the mobile device. For example, the system generates a list of the usernames in the sorted order. At operation 6820, the generated list is displayed on the display device of the mobile device. For example, the list may be displayed as shown on the leader board of FIG. 63.

Figure 69:
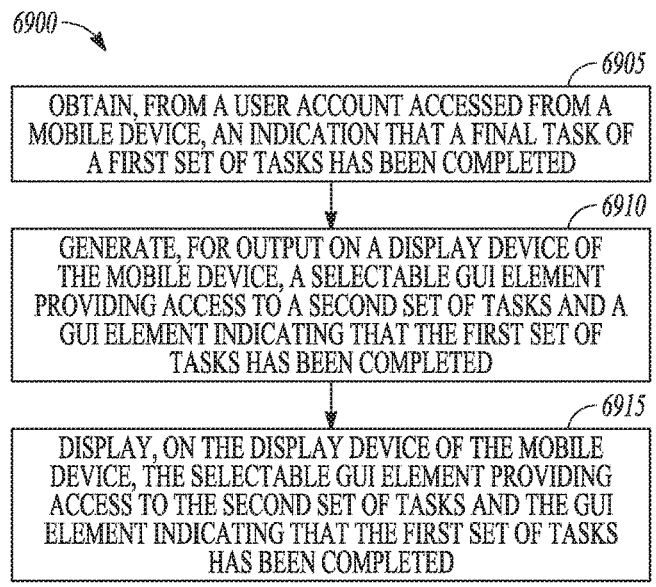

FIG. 69 illustrates a method 6900 for delivering a task workflow to a user of a mobile application for implementing systems and methods for computer guided coaching as a game on a mobile device. At operation 6905, an indication that a final task of a first set of tasks has been completed is obtained from a user account accessed from a mobile device. For example, the user may have completed the last task in the "Ideal Client" activity track. At operation 6910, a selectable GUI element providing access to a second set of tasks and a GUI element indicating that the first set of tasks has been completed is generated for output on a display of the mobile device. For example, a selectable GUI element of a heart may be generated to provide access to a "Business Process" set of tasks and a GUI element of a checkmark may be generated for the "Ideal Client" set of tasks. At operation, 6915, the selectable GUI element for providing access to the second set of tasks and the GUI element indicating that the first set of tasks has been completed is displayed on the display device of the mobile device. For example, the GUI elements may be displayed as shown in FIG. 62.

Figure 70:
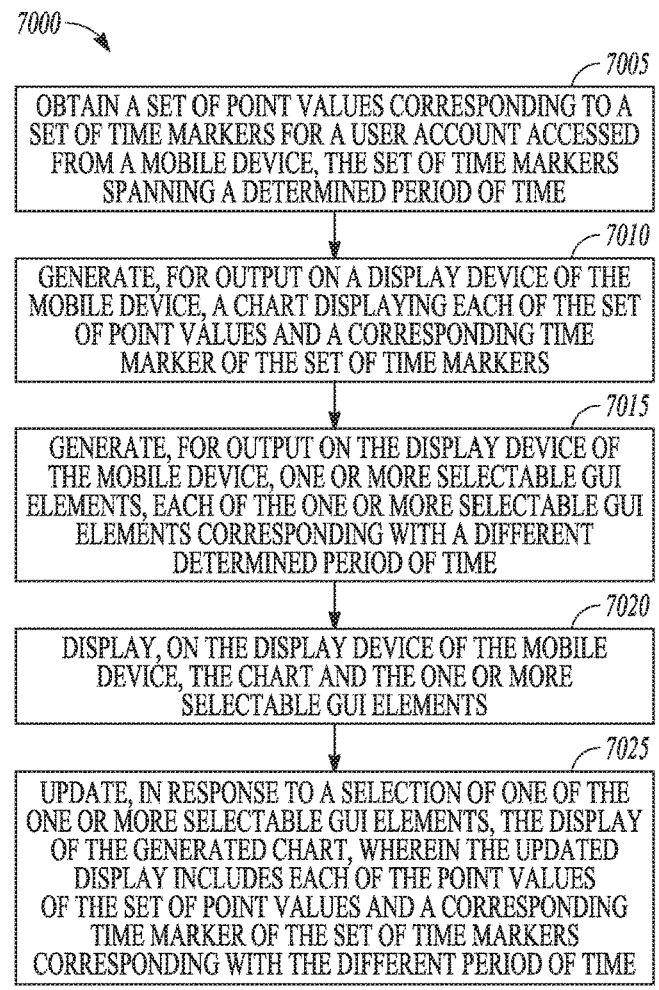

FIG. 70 illustrates a method 7000 for creating and displaying a progress chart to a user of a mobile application for implementing systems and methods for computer guided coaching as a game on a mobile device. At operation 7005 a set of point values corresponding to a set of time markers for a user account accessed from a mobile device may be obtained. The set of time markers span a determined period of time. For example, the point values for each day of the week for a one week period may be obtained. At operation 7010, a chart displaying each of the set of point values and a corresponding time marker of the set of time markers may be generated for output on a display device of the mobile device. For example, a line graph may be generated with the x-axis being a scale of point values and the y-axis being a scale of the time markers. At operation 7015, one or more selectable GUI elements may be generated for output on the display device of the mobile device, each of the one or more selectable GUI elements correspond with a different determined period of time. For example, a selectable GUI element for weekly, monthly, or daily time periods may be generated. At operation 7020, the chart and the one or more selectable GUI elements in displayed on the display device of the mobile device. For example, the chart and selectable GUI elements may be displayed as shown in FIG. 61. At operation 7025, the display of the generated chart is updated in response to a selection of one of the one or more selectable GUI elements. The updated display includes each of the point values of the set of point values and a corresponding time marker of the set of time markers corresponding with the different period of time. For example, in response to the user selecting the monthly selectable GUI element the chart may display the y-axis on a monthly scale and the corresponding point values and time markers may be displayed on the line graph over the monthly scale.

Example Operating Environment

Figure 71:
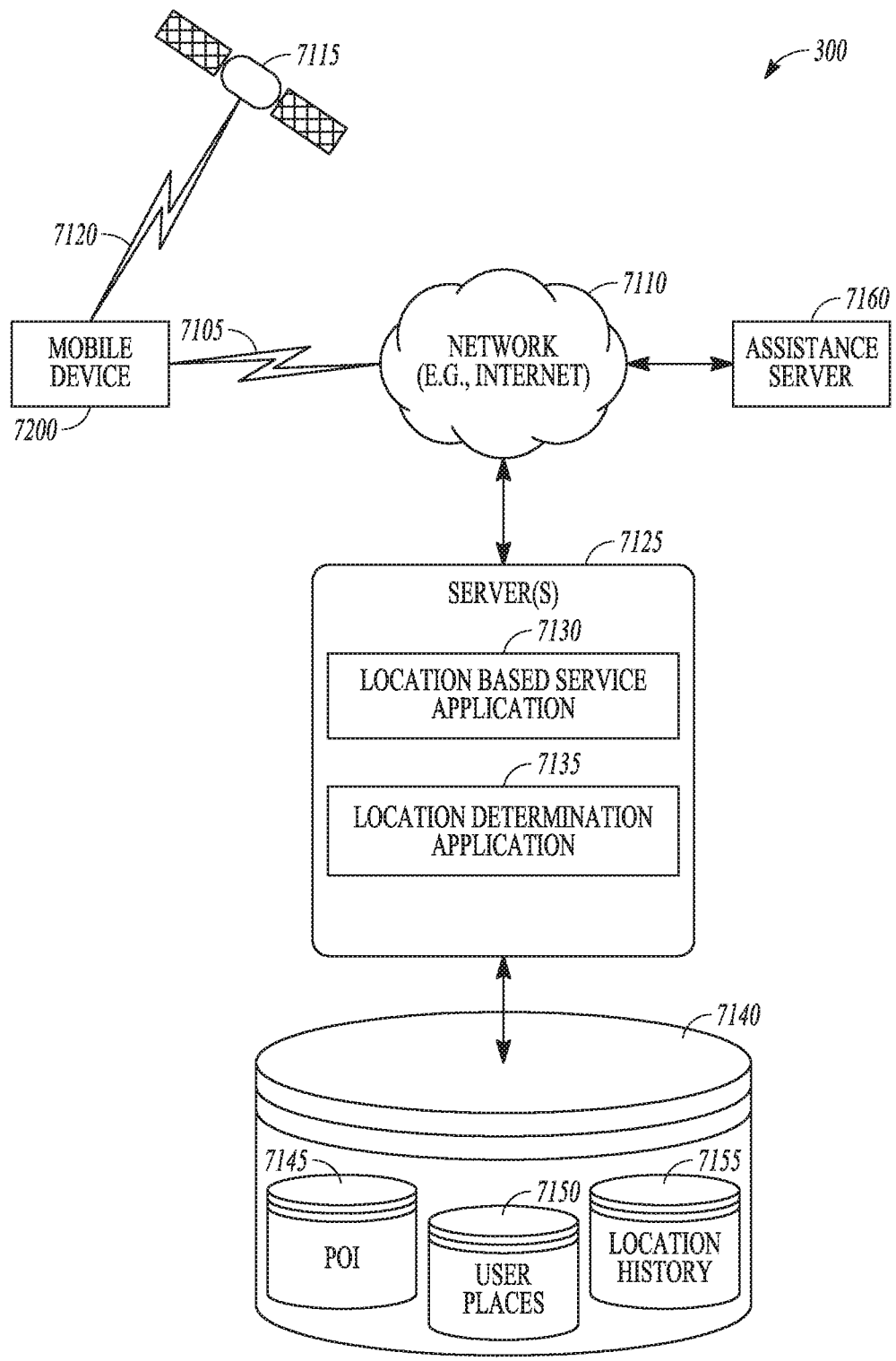
FIG. 71 is a block diagram illustrating an environment for operating a mobile device, according to an example embodiment.

FIG. 71 is a block diagram illustrating an environment 7100 for operating a mobile device 7200, according to an example embodiment, for deploying and/or implementing the coaching system and methods described herein. The mobile electronic device 7200 may be any of a variety of types of devices, for example a cellular telephone, a personal digital assistant (PDA), a Personal Navigation Device (PND), a handheld computer, a tablet computer, a notebook computer, or other type of movable device. The device 7200 may interface via a connection 7105 with a communication network 7110. Depending on the form of the mobile electronic device 7200, any of a variety of types of connections 7105 and communication networks 7110 may be used. The device 7200 may further interface with a satellite 7115 via a link 7120. In some embodiments, the device 7200 may interface with a radio tower using a variety of cellular communication protocols.

For example, the connection 7105 may be Code Division Multiple Access (CDMA) connection, a Global System for Mobile communications (GSM) connection, or other type of cellular connection. Such connection 7105 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, or other data transfer technology. When such technology is employed, the communication network 7110 may include a cellular network that has a plurality of cell sites of overlapping geographic coverage, interconnected by cellular telephone exchanges. These cellular telephone exchanges may be coupled to a network backbone, for example, the public switched telephone network (PSTN), a packet-switched data network, or to other types of networks.

In another example, the connection 7105 may be Wireless Fidelity (Wi-Fi, IEEE 802.9x type) connection, a Worldwide Interoperability for Microwave Access (WiMAX) connection, or another type of wireless data connection. In such an embodiment, the communication network 7110 may include one or more wireless access points coupled to a local area network (LAN), a wide area network (WAN), the Internet, or other packet-switched data network.

In yet another example, the connection 7105 may be a wired connection, for example an Ethernet link, and the communication network may be a local area network (LAN), a wide area network (WAN), the Internet, or other packet-switched data network. Accordingly, a variety of different configurations are expressly contemplated.

A plurality of servers 7125 may be coupled via interfaces to the communication network 7110, for example, via wired or wireless interfaces. These servers 7125 may be configured to provide various types of services to the mobile electronic device 7200. For example, one or more servers 7125 may execute location based service (LBS) applications 7130, which interoperate with software executing on the device 7200, to provide LBS's to a user. LBS's can use knowledge of the device's location, and/or the location of other devices, to provide location-specific information, recommendations, notifications, interactive capabilities, and/or other functionality to a user. Knowledge of the device's location, and/or the location of other devices, may be obtained through interoperation of the device 7200 with a location determination application 7135 executing on one or more of the servers 7125. Location information may also be provided by the device 7200, without use of a location determination application, such as application 7135. In certain examples, the device 7200 may have some limited location determination capabilities that are augmented by the location determination application 7135. The servers are coupled to database 7140, which includes point of interest files 7145, user place files 7150, and location history files 7155.

Example Mobile Device

Figure 72:
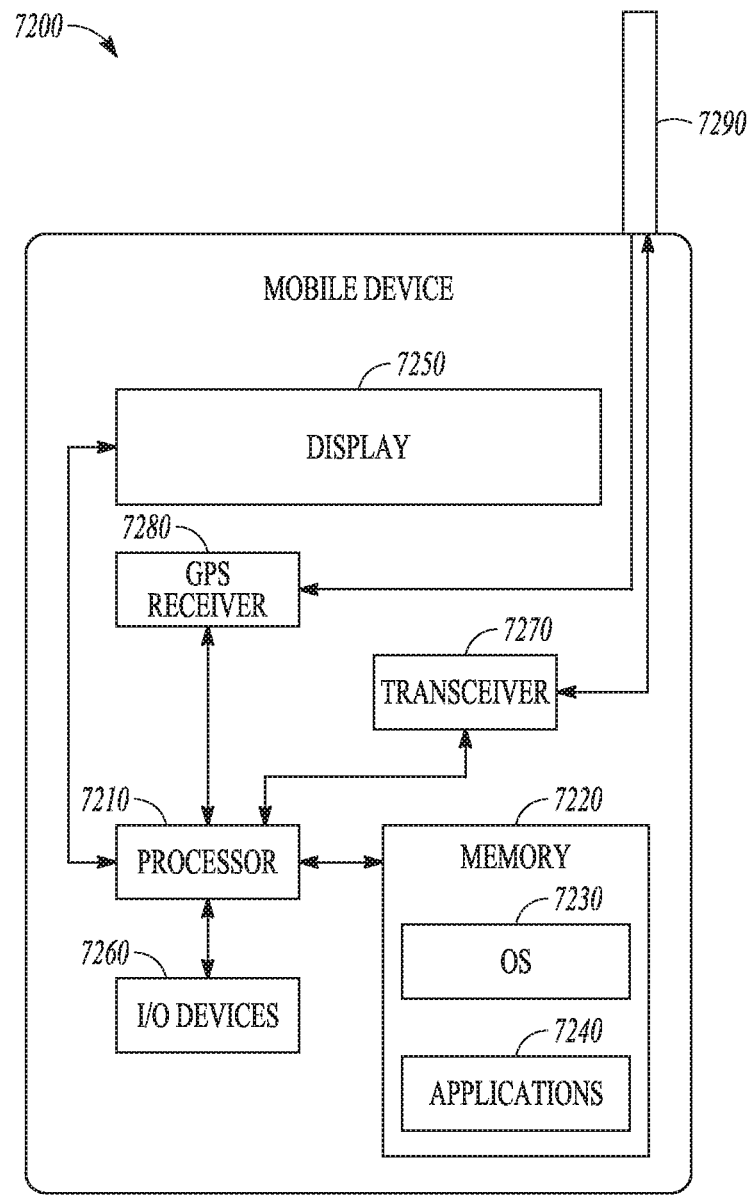
FIG. 72 is a block diagram illustrating a mobile device, according to an example embodiment.

FIG. 72 is a block diagram illustrating the mobile device 7200, according to an example embodiment, for deploying and/or implementing the coaching system and methods described herein. The device 7200 may include a processor 7210. The processor 7210 may be any of a variety of different types of commercially available processors suitable for mobile devices, for example, an XScale architecture microprocessor, a Microprocessor without Interlocked Pipeline Stages (MIPS) architecture processor, or another type of processor. A memory 7220, such as a Random Access Memory (RAM), a Flash memory, or other type of memory, is typically accessible to the processor. The memory 7220 may be adapted to store an operating system (OS) 7230, as well as application programs 7240, such as a mobile location enabled application that may provide LBS's to a user. The processor 7210 may be coupled, either directly or via appropriate intermediary hardware, to a display 7250 and to one or more input/output (I/O) devices 7260, such as a keypad, a touch panel sensor, a microphone, etc. Similarly, in some embodiments, the processor 7210 may be coupled to a transceiver 7270 that interfaces with an antenna 7290. The transceiver 7270 may be configured to both transmit and receive cellular network signals, wireless data signals, or other types of signals via the antenna 7290, depending on the nature of the device 7200. In this manner, the connection 7210 with the communication network 7220 may be established. Further, in some configurations, a GPS receiver 7280 may also make use of the antenna 7290 to receive GPS signals.

Example Platform Architecture

Figure 73:
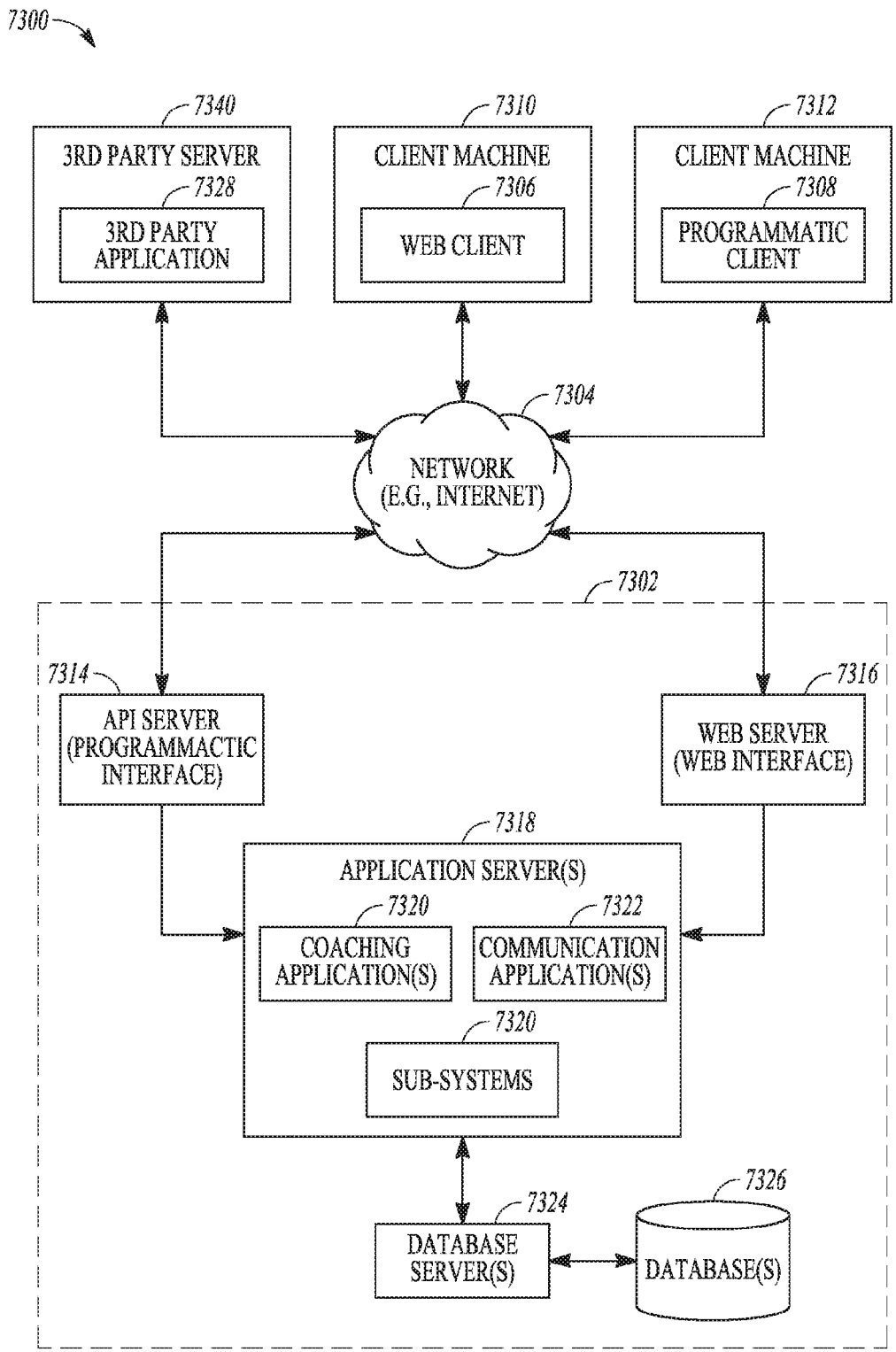
FIG. 73 is a block diagram illustrating a network-based system for delivering coaching content and interacting with coaching recipients, according to an example embodiment.

FIG. 73 is a block diagram illustrating a network-based system 7300 for deploying and/or implementing the coaching system and methods described herein. In an embodiment, the system operates in real time or near real-time. The block diagram depicting a client-server system 7300, within which an example embodiment can be deployed is described. A networked system 7302, in the example forms a network-based coaching system, provides server-side functionality, via a network 7304 (e.g., the Internet or Wide Area Network (WAN)) to one or more clients 7310, 7312. FIG. 73 illustrates, for example, a web client 7306 (e.g., a browser, such as the Internet Explorer browser developed by Microsoft Corporation of Redmond, Wash. State), and a programmatic client 7308 (e.g., WHERE smartphone application from Where, Inc. of Boston, Mass.) executing on respective client machines 7310 and 7312. In an example, the client machines 7310 and 7312 can be in the form of a mobile device, such as mobile device 7200.

An Application Programming Interface (API) server 7314 and a web server 7316 are coupled to, and provide programmatic and web interfaces respectively to, one or more application servers 7318. The application servers 7318 host one or more coaching applications 7320 (in certain examples these computer program components are those described herein for the coaching system), communication applications 7322, and other sub-systems 7332. The application servers 7318 are, in turn, shown to be coupled to one or more database servers 7324 that facilitate access to one or more databases 7326. In some examples, the application server 7318 can access the databases 7326 directly without the need for a database server 7324.

The coaching applications 7320 may provide a number of coaching functions and services to users that access the networked system 7302, as described otherwise herein. The communication applications 7322 may likewise provide a number of communication services and functions to users, for example to interface with and send messages and data between various communication applications, including e-mail services, text messaging services, instant messaging services, or other communication services, such as messaging through social media platforms. While the coaching applications 7320 and communication applications 7322, and other sub-systems 7332 are shown in FIG. 73 to all form part of the networked system 7302, it will be appreciated that, in alternative embodiments, the applications 7320 and 7322 or others may form part of a service that is separate and distinct from the networked system 7302.

Further, while the system 7300 shown in FIG. 73 employs a client-server architecture, the present invention is of course not limited to such an architecture, and could equally well find application in a distributed, or peer-to-peer, architecture system, for example. The various applications 7320, applications 7322, and sub-system 7332 could also be implemented as standalone software programs, which do not necessarily have networking capabilities.

The web client 7306 accesses the various coaching applications 7320, communication applications 7322, and optional sub-systems 7332 via the web interface supported by the web server 7316. Similarly, the programmatic client 7308 accesses the various services and functions provided by the applications, servers 7320, 7322 and 7332 via the programmatic interface provided by the API server 7314. The programmatic client 7308 may, for example, be a local recommendation smartphone application (e.g., the WHERE application developed by Where, Inc., of Boston, Mass.) to enable users to receive real-time location-aware merchant promotions on their smartphones leveraging user profile data and current location information provided by the smartphone.

FIG. 73 also illustrates a third party application 7328, executing on a third party server machine 7340, as having programmatic access to the networked system 7302 via the programmatic interface provided by the API server 7314. For example, the third party application 7328 may, utilizing information retrieved from the networked system 7302, support one or more features or functions on a website hosted by the third party. The third party website may, for example, provide one or more functions that are supported by the relevant applications of the networked system 7302.

Modules, Components and Logic

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiples of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation, and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 74:
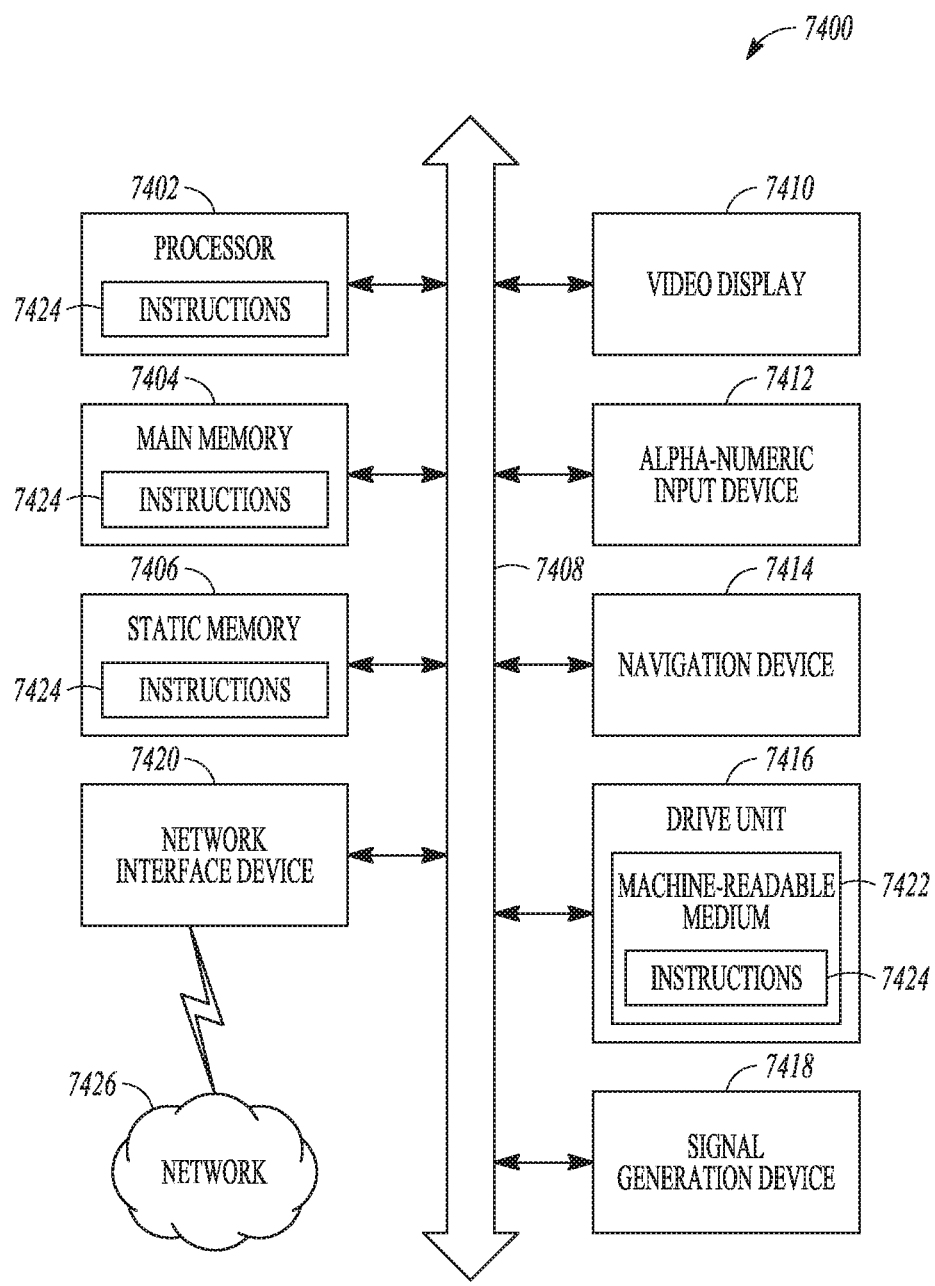
FIG. 74 is a diagrammatic representation of a machine in the example form of a computer system within which a set of instructions for causing the machine to perform any one or more of the methodologies discussed herein may be executed.

FIG. 74 is a block diagram of a machine in the example form of a computer system 7400 within which instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 7400 includes a processor 7402 (e.g., a central processing unit (CPU), a graphics processing unit (GPU) or both), a main memory 7404 and a static memory 7406, which communicate with each other via a bus 7408. The computer system 7400 may further include a video display unit 7410 (e.g., a liquid crystal display (LCD) or a cathode ray tube (CRT)). The computer system 7400 also includes an alphanumeric input device 7412 (e.g., a keyboard), a user interface (UI) navigation device 7414 (e.g., a mouse), a disk drive unit 7416, a signal generation device 7418 (e.g., a speaker) and a network interface device 7420.

Machine-Readable Medium

The disk drive unit 7416 includes a machine-readable medium 7422 on which is stored one or more sets of instructions and data structures (e.g., software) 7424 embodying or used by any one or more of the methodologies or functions described herein. The instructions 7424 may also reside, completely or at least partially, within the main memory 7404 and/or within the processor 7402 during execution thereof by the computer system 7400, the main memory 7404 and the processor 7402 also constituting machine-readable media.

While the machine-readable medium 7422 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures used by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Transmission Medium

The instructions 7424 may further be transmitted or received over a communications network 7426 using a transmission medium. The instructions 7424 may be transmitted using the network interface device 7420 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Thus, a method and system for computer guided coaching have been described. Although the present invention has been described with reference to specific example embodiments, it will be evident that various modifications and changes may be made to these embodiments without departing from the broader scope of the invention. Accordingly, the specification and drawings are to be regarded in an illustrative rather than a restrictive sense.

Although an embodiment has been described with reference to specific example embodiments, it will be evident that various modifications and changes may be made to these embodiments without departing from the broader scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract of the Disclosure is provided to comply with 35 C.F.R. § 1.70(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A system comprising:
   a mobile device comprising a display device and at least one environmental sensor; and
   a cloud-based service comprising:
   at least one processor;
   at least one database;
   at least one machine readable medium containing instructions stored thereon that, when executed by the at least one processor, configure the at least one processor to:
   generate, for rendering using the display device of the mobile device, a first view of a graphical user interface including a selectable user interface element corresponding with a first activity;
   calculate an existing points total for a user of the mobile device;
   identify a number of times the selectable user interface element has been selected over a period of time from a first activity history of the user collected from the at least one environmental sensor of the mobile device;
   determine a first activity points value for the first activity using the first activity and the number of times the selectable user interface element has been selected over the period of time;
   calculate, upon receiving an indication of a subsequent selection of the selectable user interface element from the at least one environmental sensor, a new points total for the user by summing the existing points total and the first activity points value;
   generate, for rendering using the display device of the mobile device, an indication of the first activity points value, wherein the first activity points value indicates points that were added to the existing points total upon completion of the first activity, and wherein the first activity points value is rendered as an overlay on the first view of the graphical user interface upon the subsequent selection of the selectable user interface element;
   transmit, for rendering using the display device of the mobile device, an update to the first view of the graphical user interface to modify the selectable user interface element to include a user interface element indicating that the activity has been completed, wherein the user interface element indicating that the activity has been completed replaces a user interface element indicating that the activity has not been completed; and
   upon expiration of a window of time, remove the overlay from the first view of the graphical user interface and transmit, for rendering using the display device of the mobile device, in the first view of the graphical user interface, a second selectable user interface element, the second selectable user interface element corresponding with a second activity.

2. The system of claim 1, further comprising instructions to:
- identify a points total for at least one other user;
- compare the new points total for the user to the points total for at least one other user;
- create a sorted list including the new points total of the user and the points total for the at least one other user; and
- generate; for rendering using the display device of the mobile device, in a second view of the graphical user interface, a graphical representation of the sorted list including an identification of the user and an identification the at least one other user.

3. The system of claim 2, wherein the points total for the at least one other user is identified based on the points total being lower than the new points total of the user and the user is higher on the sorted list.

4. The system of claim 2, wherein the points total for the at least one other user is identified based on the points total being higher than the new points total of the user and the user is lower on the sorted list.

5. The system of claim 1, wherein the period of time is one week and the first activity points value is increased when the number of times the selectable user interface element is selected is three.

6. The system of claim 1, wherein the instructions to provide an indication of the first activity points value includes instructions to provide a corresponding message for rendering using the display device of the mobile device.

7. The system of claim 1, wherein the second activity is subsequent to the first activity in an activity workflow.

8. A method for mobile coaching using a cloud-based service and a mobile device comprising:
- generating, by the cloud-based service for rendering using a display device of the mobile device, a first view of a graphical user interface including a selectable user interface element corresponding with a first activity;
- calculating an existing points total for a user of the mobile device;
- identifying a number of times the selectable user interface element has been selected over a period of time from a first activity history of the user collected from at least one environmental sensor of the mobile device;
- determining a first activity points value for the first activity using the first activity and the number of times the selectable user interface element has been selected over the period of time;
- calculating, upon receiving an indication of a subsequent selection of the selectable user interface element from the at least one environmental sensor, a new points total for the user by summing the existing points total and the first activity points value;
- generating, by the cloud-based service for rendering using the display device of the mobile device, an indication of the first activity points value, wherein the first activity points value indicates points that were added to the existing points total upon completion of the first activity, and wherein the first activity points value is rendered as an overlay on the first view of the graphical user interface upon the subsequent selection of the selectable user interface element;
- transmitting, by the cloud-based service for rendering using the display device of the mobile device, an update to the first view of the graphical user interface to modify the selectable user interface element to include a user interface element indicating that the activity has been completed, wherein the user interface element indicating that the activity has been completed replaces a user interface element indicating that the activity has not been completed; and
- upon expiration of a window of time, removing the overlay from the first view of the graphical user interface and transmitting, by the cloud-based service for rendering using the display device of the mobile device, in the first view of the graphical user interface, a second selectable user interface element, the second selectable user interface element corresponding with a second activity.

9. The method of claim 8, further comprising:
- identifying a points total for at least one other user;
- comparing the new points total for the user to the points total for at least one other user;
- creating a sorted list including the new points total of the user and the points total for the at least one other user; and
- generating, for rendering using the display device of the mobile device, in a second view of the graphical user interface, a graphical representation of the sorted list including an identification of the user and an identification the at least one other user.

10. The method of claim 9, wherein identifying the points total for the at least one other user is based on the points total being lower than the new points total of the user and the user is higher on the sorted list.

11. The method of claim 9, wherein identifying the points total for the at least one other user is based on the points total being higher than the new points total of the user and the user is lower on the sorted list.

12. The method of claim 8, wherein the period of time is one week and the first activity points value is increased when the number of times the selectable user interface element is selected is three.

13. The method of claim 8, wherein providing an indication of the first activity points value includes providing a corresponding message for rendering using the display device of the mobile device.

14. The method of claim 8, wherein the second activity is subsequent to the first activity in an activity workflow.

15. At least one non-transitory machine readable medium comprising as set of instructions that, when executed by at least one processor, cause a machine to:
- generate, for rendering using a display device of a mobile device, a first view of a graphical user interface including a selectable user interface element corresponding with a first activity;
- calculate an existing points total for a user of the mobile device;
- identify a number of times the selectable user interface element has been selected over a period of time from a first activity history of the user collected from at least one environmental sensor of the mobile device;
- determine a first activity points value for the first activity using the first activity and the number of times the selectable user interface element has been selected over the period of time;
- calculate, upon receiving an indication of a subsequent selection of the selectable user interface element from the at least one environmental sensor, a new points total for the user by summing the existing points total and the first activity points value;
- generate, for rendering using the display device of the mobile device, an indication of the first activity points value, wherein the first activity points value indicates points that were added to the existing points total upon completion of the first activity, and wherein the first activity points value is rendered as an overlay on the first view of the graphical user interface upon the subsequent selection of the selectable user interface element:

transmit, for rendering using the display device of the mobile device, an update to the first view of the graphical user interface to modify the selectable user interface element to include a user interface element indicating that the activity has been completed, wherein the user interface element indicating that the activity has been completed replaces a user interface element indicating that the activity has not been completed; and upon expiration of a window of time, remove the overlay from the first view of the graphical user interface and transmit, for rendering using the display device of the mobile device, in the first view of the graphical user interface, a second selectable user interface element, the second selectable user interface element corresponding with a second activity.

16. The at least one machine readable medium of claim 15, wherein the set of instructions includes instructions to:
identify a points total for at least one other user;
compare the new points total for the user to the points total for at least one other user;
create a sorted list including the new points total of the user and the points total for the at least one other user; and
generate, for rendering using the display device of the mobile device, in a second view of the graphical user interface, a graphical representation of the sorted list including an identification of the user and an identification the at least one other user.

17. The at least one machine readable medium of claim 16, wherein the points total for the at least one other user is identified based on the points total being lower than the new points total of the user and the user is higher on the sorted list.

18. The at least one machine readable medium of claim 16, wherein the points total for the at least one other user is identified based on the points total being higher than the new points total of the user and the user is lower on the sorted list.

19. The at least one machine readable medium of claim 15, wherein the period of time is one week and the first activity points value is increased when the number of times the selectable user interface element is selected is three.

20. The at least one machine readable medium of claim 15, wherein the instructions to provide an indication of the first activity points value includes instructions to provide a corresponding message for rendering using the display device of the mobile device.

21. The at least one machine readable medium of claim 15, wherein the second activity is subsequent to the first activity in an activity workflow.

* * * * *

UNITED STATES PATENT AND TRADEMARK OFFICE
CERTIFICATE OF CORRECTION

PATENT NO. : 10,186,167 B2
APPLICATION NO. : 15/140096
DATED : January 22, 2019
INVENTOR(S) : Spenser Segal Page 1 of 1

It is certified that error appears in the above-identified patent and that said Letters Patent is hereby corrected as shown below:

In the Claims

In Column 27, Line 9, in Claim 2, delete "generate;" and insert --generate,-- therefor In Column 29, Line 5, in Claim 15, delete "element:" and insert --element;-- therefor Signed and Sealed this
Tenth Day of March, 2020

Andrei Iancu
*Director of the United States Patent and Trademark Office*